(12) United States Patent
Yamane et al.

(10) Patent No.: US 7,690,851 B2
(45) Date of Patent: Apr. 6, 2010

(54) IMAGING APPARATUS

(75) Inventors: Akira Yamane, Nagoya (JP); Eiji Sugiyama, Nagoya (JP)

(73) Assignee: Elmo Company, Limited (JP)

( * ) Notice: Subject to any disclaimer, the term of this patent is extended or adjusted under 35 U.S.C. 154(b) by 269 days.

(21) Appl. No.: 11/678,352

(22) Filed: Feb. 23, 2007

(65) Prior Publication Data
US 2008/0013944 A1    Jan. 17, 2008

(30) Foreign Application Priority Data
Jul. 11, 2006 (JP) .............................. 2006-190184

(51) Int. Cl.
*G03B 17/00* (2006.01)
*H04N 9/47* (2006.01)
*H04N 5/225* (2006.01)

(52) U.S. Cl. ..................... 396/427; 348/143; 348/151; 348/373; 348/374

(58) Field of Classification Search ................ 396/427; 348/151, 143, 373, 374; 359/535
See application file for complete search history.

(56) References Cited

U.S. PATENT DOCUMENTS

| | | | |
|---|---|---|---|
| 6,268,882 B1* | 7/2001 | Elberbaum | 348/151 |
| 6,793,414 B2* | 9/2004 | Akada | 396/427 |
| 7,202,904 B2* | 4/2007 | Wei | 348/373 |
| 2007/0041727 A1* | 2/2007 | Lee | 396/427 |
| 2007/0053681 A1* | 3/2007 | Arbuckle | 396/427 |
| 2008/0008467 A1* | 1/2008 | Liu | 396/427 |

FOREIGN PATENT DOCUMENTS

| | | |
|---|---|---|
| JP | 2-4319 | 1/1990 |
| JP | 6-9264 | 2/1994 |

* cited by examiner

*Primary Examiner*—W. B. Perkey
*Assistant Examiner*—Noam Reisner
(74) *Attorney, Agent, or Firm*—Ostrolenk Faber LLP

(57) ABSTRACT

An imaging apparatus, for example, a security camera, having a camera assembly including a camera mounted on and supported by a base and pivotally rotatable both in a vertical direction and in a horizontal direction to allow tilting and panning motions of the camera. The camera assembly is supported on an assembly fixation structure of the base to allow the tilting motion of the camera assembly. The assembly fixation structure is panned relative to a base foot of the base. A panning rotation gear for the panning motions of the camera is fixed on a ground plate, which has a positional change relative to a pedestal plate unit in the assembly fixation structure. A tilting motor, a panning motor, and vertical and horizontal rotation transmission mechanisms for the tilting motions and the panning motions of the camera are arranged on the pedestal plate unit of the assembly fixation structure. The tilting motor and the panning motor are arranged having respective output shafts in the horizontal direction and face each other across a pivot shaft fitting element on the pedestal plate unit.

5 Claims, 21 Drawing Sheets

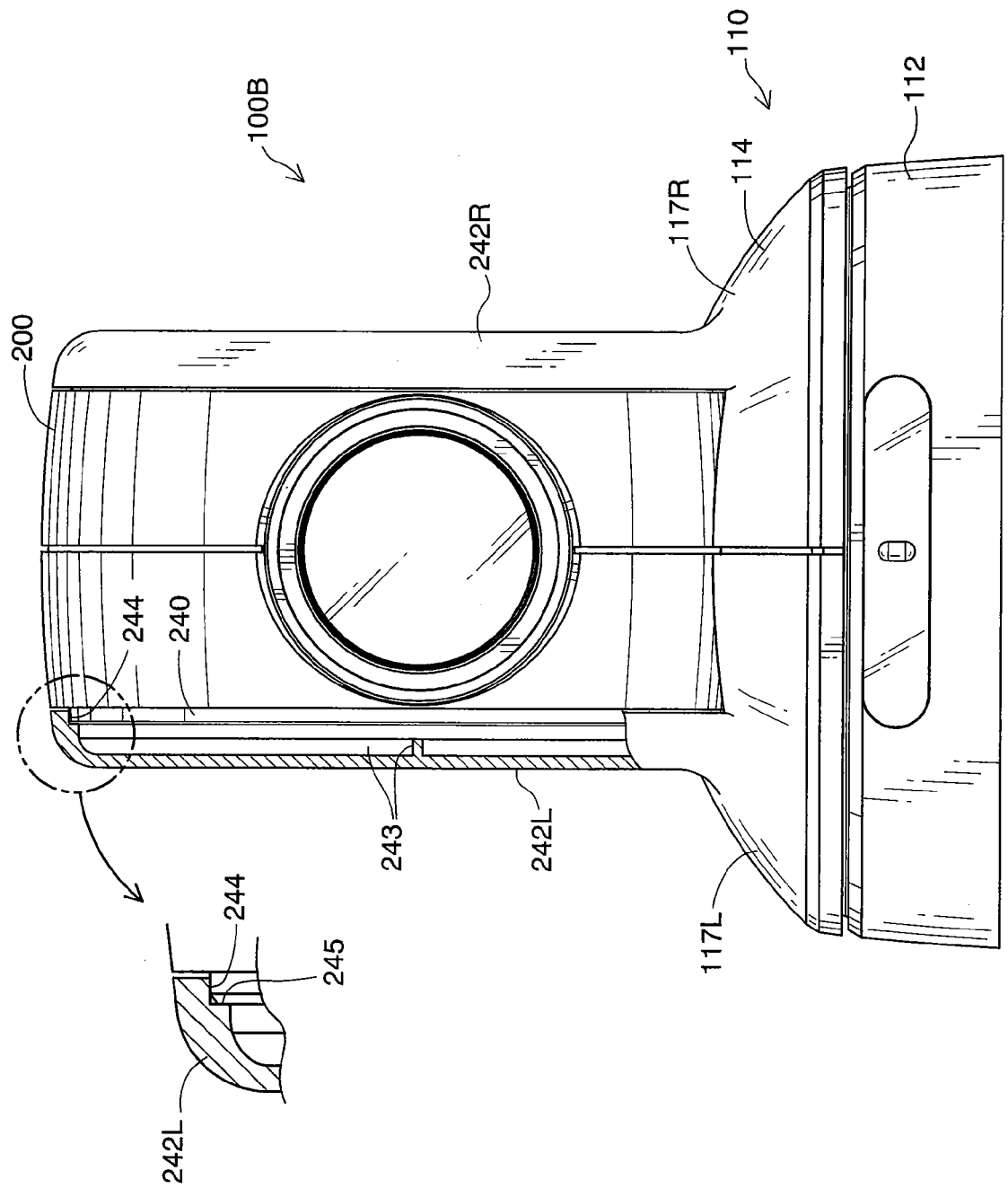

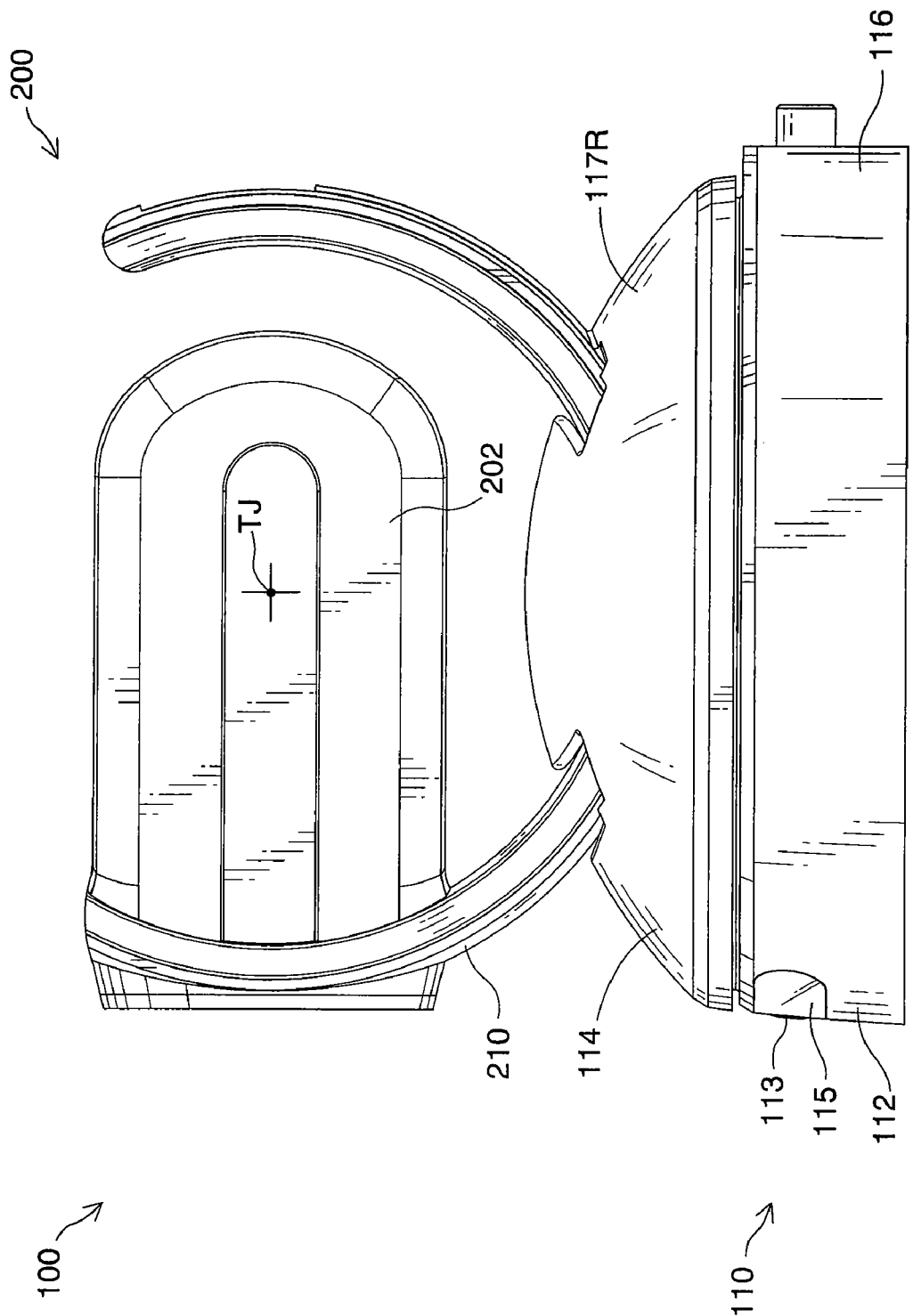

IMAGING APPARATUS

CROSS-REFERENCE TO RELATED APPLICATION

The present application claims the priority based on Japanese Patent Application No. 2006-190184 filed on Jul. 11, 2006, the disclosure of which is hereby incorporated by reference in its entirety.

BACKGROUND OF THE INVENTION

1. Field of the Invention

The present invention relates to an imaging apparatus equipped with a camera rotatable both in a vertical direction and in a horizontal direction.

2. Description of the Related Art

Imaging apparatuses have diversity of applications and are used, for example, as security cameras in various locations including banks, railway stations, supermarkets, convenience stores, and video game arcades.

Security camera devices are generally designed to allow pivotal rotations of a camera in a horizontal direction (hereafter also referred to as panning motions), as well as pivotal rotations of the camera in a vertical direction (hereafter also referred to as tilting motions), with a view to expanding the monitoring area (cited reference 1: Japanese Utility Model Laid-Open Gazette No. H06-9264, cited reference 2: Japanese Utility Model Publication Gazette No. H02-4319).

In the typical structure of the security camera device disclosed in these cited references, a camera unit including a camera is supported on a base. The camera unit alone is rotated for the tilting motions, while being rotated integrally with part of the base for the panning motions. The security camera device accordingly requires different pivot support structures for the tilting motions and for the panning motions. In the structure of the cited reference 1, the pivot support structure for the tilting motions is located with a tilting motor as its driving source in the periphery of a vertical pivot axis of the camera. The pivot support structure for the panning motions is built in the base apart from the camera. In the structure of the cited reference 2, both the pivot support structures for the tilting motions and for the panning motions are built in the base.

The separate arrangement of the cited reference 1 is disadvantageous from the viewpoint of space saving. The additional built-in of a tilting motor as the driving source of the pivot support structure for the tilting motions in the base, however, undesirably expands the size of the base and is disadvantageous from the viewpoint of downsizing. In the security camera device of the cited reference 2, a tilting motor as the driving source of the pivot support structure for the tilting motions and a panning motor as the driving source of the pivot support structure for the panning motions are arranged to have a partial positional overlap on a horizontal plane. This has some downsizing effect but is not sufficient at all. There is still room for further size reduction of the security camera device.

SUMMARY

There is accordingly a need for further downsizing an imaging apparatus applied to, for example, a security camera.

The present invention is directed to an imaging apparatus equipped with a camera in a pivotally rotatable manner both in a vertical direction and in a horizontal direction. The imaging apparatus includes: a base that has a built-in vertical rotation driving source to generate a driving force for pivotal rotation of the camera in the vertical direction and a built-in horizontal rotation driving source to generate a driving force for pivotal rotation of the camera in the horizontal direction; and a camera unit including the camera. The camera unit is pivotally supported on the base by a camera unit pivotal support structure to allow pivotal rotation of the camera in the vertical direction. A vertical rotation transmission mechanism transmits the driving force of the vertical rotation driving source, as power of the pivotal rotation of the camera in the vertical direction, to the camera unit, so as to rotate the camera unit including the camera in the vertical direction. The transmission of the driving force generated by the vertical rotation driving source enables the camera unit with the camera mounted on the base to be rotated in the vertical direction.

The base has a ground plate and a pedestal plate. The ground plate is directly placed on surface of a supporting subject of the imaging apparatus. The pedestal plate has the vertical rotation driving source disposed thereon, as well as the camera unit pivotal support structure and the vertical rotation transmission mechanism incorporated therein. The camera unit is supported and held on the pedestal plate of the base in a vertically rotatable manner by the camera unit pivotal support structure.

The pedestal plate is mounted on the ground plate by a plate mounting structure to allow pivotal rotation of the pedestal plate in the horizontal direction relative to the ground plate. The camera unit with the camera supported on the pedestal plate is pivotally rotatable in the vertical direction and is rotatable integrally with the pedestal plate in the horizontal direction relative to the ground plate.

The power for the pivotal rotation of the pedestal plate and the camera unit including the camera in the horizontal direction is transmitted from the horizontal rotation driving source to a horizontal rotation gear by a horizontal rotation transmission mechanism. The horizontal rotation gear is located closer to the ground plate between the ground plate and the pedestal plate linked by the plate mounting structure. The horizontal rotation gear is attached to either a horizontal pivot axis or the ground plate in such a manner as to change a relative position of the horizontal rotation gear about the horizontal pivot axis to the pedestal plate but not to change a relative position of the horizontal rotation gear about the horizontal pivot axis to the ground plate. The horizontal rotation driving source and the horizontal rotation transmission mechanism for transmission of the power to the horizontal rotation gear are rotated integrally with the pedestal plate about the horizontal pivot axis. The camera unit with the camera is thus pivotally rotatable in the vertical direction and is rotatable integrally with the pedestal plate in the horizontal direction relative to the ground plate.

In the imaging apparatus of the invention having the configuration described above, the driving force generated by the vertical rotation driving source located on the pedestal plate of the base is transmitted to the camera unit supported on the pedestal plate to pivotally rotate the camera unit in the vertical direction relative to the base. The camera unit pivotal support structure as well as the vertical rotation driving source and the vertical rotation transmission mechanism for transmission of the driving force for the vertical rotation are disposed on the pedestal plate of the base. The pedestal plate with the camera unit held thereon is mounted on the ground plate of the base in such a manner as to allow pivotal rotation of the camera unit in the horizontal direction relative to the base. The driving force generated by the horizontal rotation driving source is transmitted to the horizontal rotation gear located closer to the ground plate. The horizontal rotation driving source and the horizontal rotation transmission unit are also disposed on the pedestal plate of the base. In the imaging apparatus of the invention, both the vertical rotation-related structure and the horizontal rotation-related structure for the vertical and horizontal rotations of the camera unit are collectively located on the pedestal plate of the base. The horizontal rotation gear is located closer to the ground plate between the pedestal plate and the ground plate. The horizontal rotation gear accordingly gives no limitation to the collective arrangement on the pedestal plate. The vertical rotation driving source and the horizontal rotation driving source may be arranged to have a substantial positional overlap on a horizontal plane. The collective arrangement on the pedestal plate has the space-saving effect in the periphery of the pedestal plate and accordingly attains downsizing of the whole imaging apparatus.

In one aspect of the imaging apparatus of the invention, the horizontal rotation driving source and the vertical rotation driving source are arranged in the attitude having the respective output shafts in the horizontal direction and are disposed to face each other across the plate mounting structure on the pedestal plate. This arrangement gives the good weight balance to the pedestal plate and accordingly stabilizes the horizontal rotation of the camera frame. The driving source generally has the greater length in the direction of the output shaft than the length in the direction perpendicular to the output shaft. The arrangement of the two driving sources in the attitude having the respective output shafts in the horizontal direction accordingly has the space-saving effect. This concentrated arrangement contributes to the further downsizing of the base.

In one preferable embodiment of the imaging apparatus of the invention, for the pivotal rotation of the camera in the vertical direction, the camera unit includes a camera frame that holds the camera in such a manner that an imaging lens of the camera is exposed on a circular arc-shaped frame side face of the camera frame to be directed to outside. The camera unit pivotal support structure pivotally supports the camera frame on the base to allow the pivotal rotation of the camera in the vertical direction about a vertical pivot axis or an axis passing through inside of the camera frame in a direction parallel to a width of the camera frame. The vertical rotation transmission mechanism transmits the driving force of the vertical rotation driving source to the camera frame via the circular arc-shaped frame side face arranged about the vertical pivot axis on its center. The power transmission system for transmitting the power for the pivotal rotation of the camera in the vertical direction is provided separately from the support system for mounting and supporting the camera frame on the base. As the power transmission system, the vertical rotation transmission mechanism transmits the driving force of the vertical rotation driving source, as power of the pivotal rotation of the camera in the vertical direction, to the camera frame via the circular arc-shaped frame side face. As the support system, the camera unit pivotal support structure pivotally supports the camera frame on the base to allow pivotal rotation of the camera frame in the vertical direction about the vertical pivot axis or the axis passing through the inside of the camera frame in the direction parallel to the width of the camera frame.

In the imaging apparatus of this embodiment, the camera unit pivotal support structure placed in the base pivotally supports the camera frame on the base. The vertical rotation transmission mechanism placed in the base transmits the driving force for the pivotal rotation of the camera frame in the vertical direction to the camera frame via the circular arc-shaped frame side face. The driving system involved in the vertical pivotal rotation of the camera frame about the vertical pivot axis or the axis passing through the inside of the camera frame in the direction parallel to the width of the camera frame is accordingly not located in either side of the camera frame. This arrangement desirably attains the space saving in the periphery of the camera frame.

This structure of transmitting the driving force of the vertical rotation driving source to the camera frame via the circular arc-shaped frame side face about the vertical pivot axis or the axis passing through the inside of the camera frame in the direction parallel to the width of the camera frame has the advantage over a prior art mechanism. In the security camera device of the above cited reference 1, the camera unit is vertically rotatable about the vertical pivot axis provided inside the camera unit. In the security camera device of the above cited reference 2, the vertical pivot axis is provided outside the camera unit to allow pivotal rotation of the camera unit in the vertical direction. In the latter arrangement placing the pivot axis outside the camera unit, the pivot axis is apart from the center of gravity of the camera unit. A large torque is accordingly required for the pivotal rotation of the camera unit. The driving source of producing a sufficiently large torque generally has large dimensions. The large-size driving source interferes with downsizing of the whole imaging apparatus.

In the imaging apparatus of the invention, on the other hand, the vertical pivot axis of the camera frame is provided inside the camera frame. The vertical pivot axis of the camera frame is located on or at least very close to the center of gravity of the camera frame. The driving force for the vertical pivotal rotation is transmitted to the camera frame via the circular arc-shaped frame side face about this vertical pivot axis. Only a small torque is thus required for the pivotal rotation of the camera frame. This enables downsizing of the driving source and thereby the whole imaging apparatus.

In the imaging apparatus of the preferable embodiment described above, the vertical pivot axis or the axis passing through the inside of the camera frame in the direction parallel to the width of the camera frame may be located on the center of gravity of the camera frame. This keeps the transmission moment of the driving force practically constant in the course of transmission of the driving force of the vertical rotation driving source to the camera frame via the circular arc-shaped frame side face. The imaging apparatus of this structure has the additional advantage of stabilizing the vertical pivotal rotation of the camera frame, in addition to the downsizing effect induced by the low required torque described above. One simple technique of making the vertical pivot axis of the camera frame located on the center of gravity of the camera frame takes into account the weight of the camera surrounded by the camera frame and adds a required weight to the camera frame. A built-in weight inside the camera frame is advantageous from the design viewpoint.

In one aspect of the imaging apparatus of the preferable embodiment, the vertical rotation transmission mechanism for transmission of the driving force has a circular arc-shaped frame gear train provided on the circular arc-shaped frame side face of the camera frame. Teeth of the circular arc-shaped gear train engage with teeth of a base-side gear provided on the base. This engagement of the gear train with the base-side gear transmits the driving force of the vertical rotation driving source to the base-side gear. This arrangement ensures effective transmission of the driving force of the vertical rotation driving source to the camera frame via the circular arc-shaped frame side face.

In another aspect of the imaging apparatus of the preferable embodiment, the camera unit pivotal support structure for pivotally supporting the camera frame on the base has a roller that supports the camera frame on its circular arc-shaped frame side face to allow pivotal rotation of the camera frame about the vertical pivot axis. The camera frame is pressed against the roller. The camera frame is thus stably rotatable on the roller. This structure enables the secure engagement of the teeth of the circular arc-shaped frame gear train with the teeth of the base-side gear and thus ensures the effective pivotal rotation of the camera frame in the vertical direction.

BRIEF DESCRIPTION OF THE DRAWINGS

FIG. 20 is a partly sectional view showing the pivot support of the camera assembly in the imaging apparatus of the second modified example; and FIG. 21 is a side view showing a camera assembly having a frame casing of a different structure in an imaging apparatus.

DESCRIPTION OF THE PREFERRED EMBODIMENTS

Figure 1:
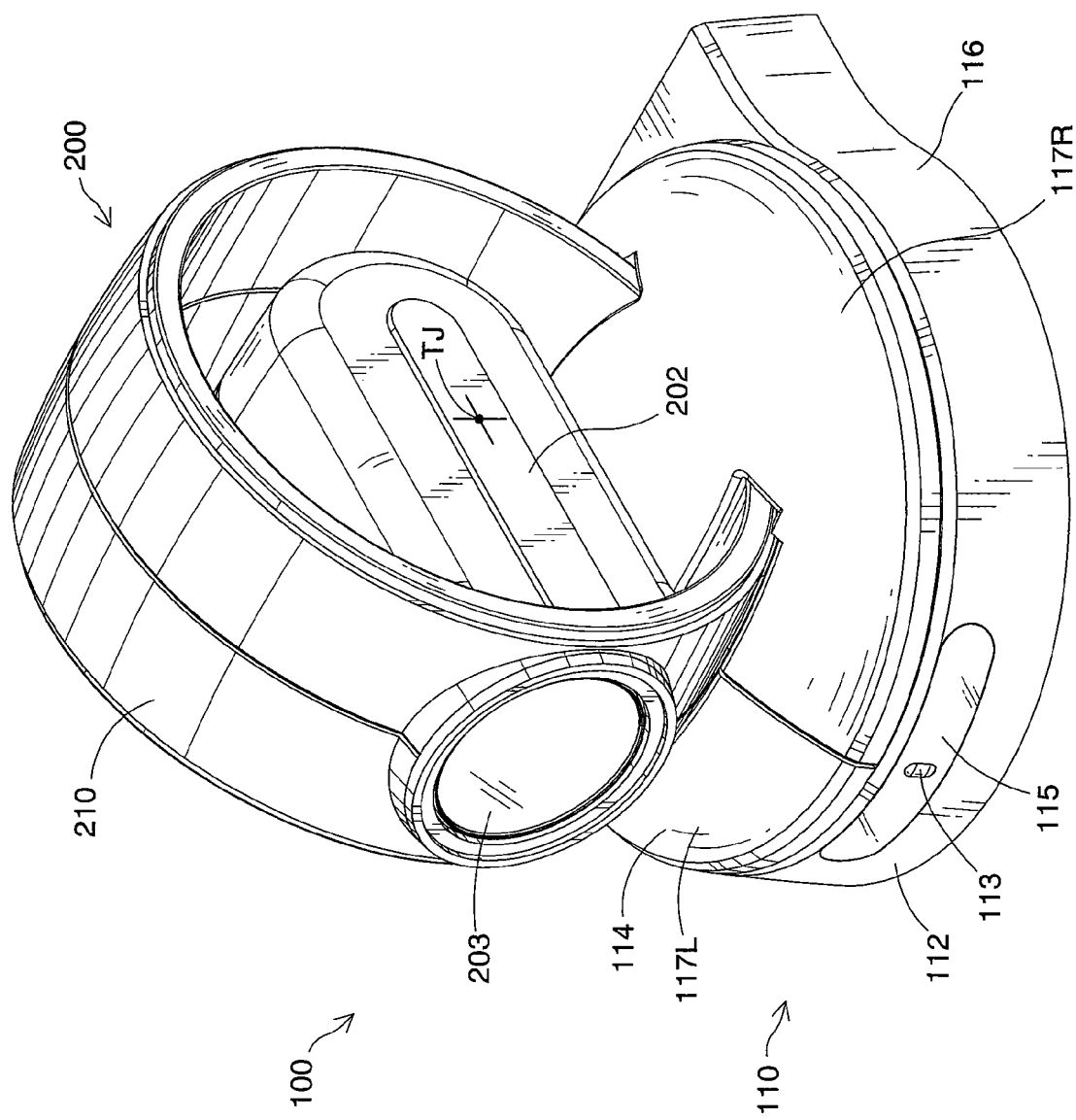
FIG. 1 is a perspective view showing an imaging apparatus as an application of a security camera in one embodiment of the invention.
Figure 2:
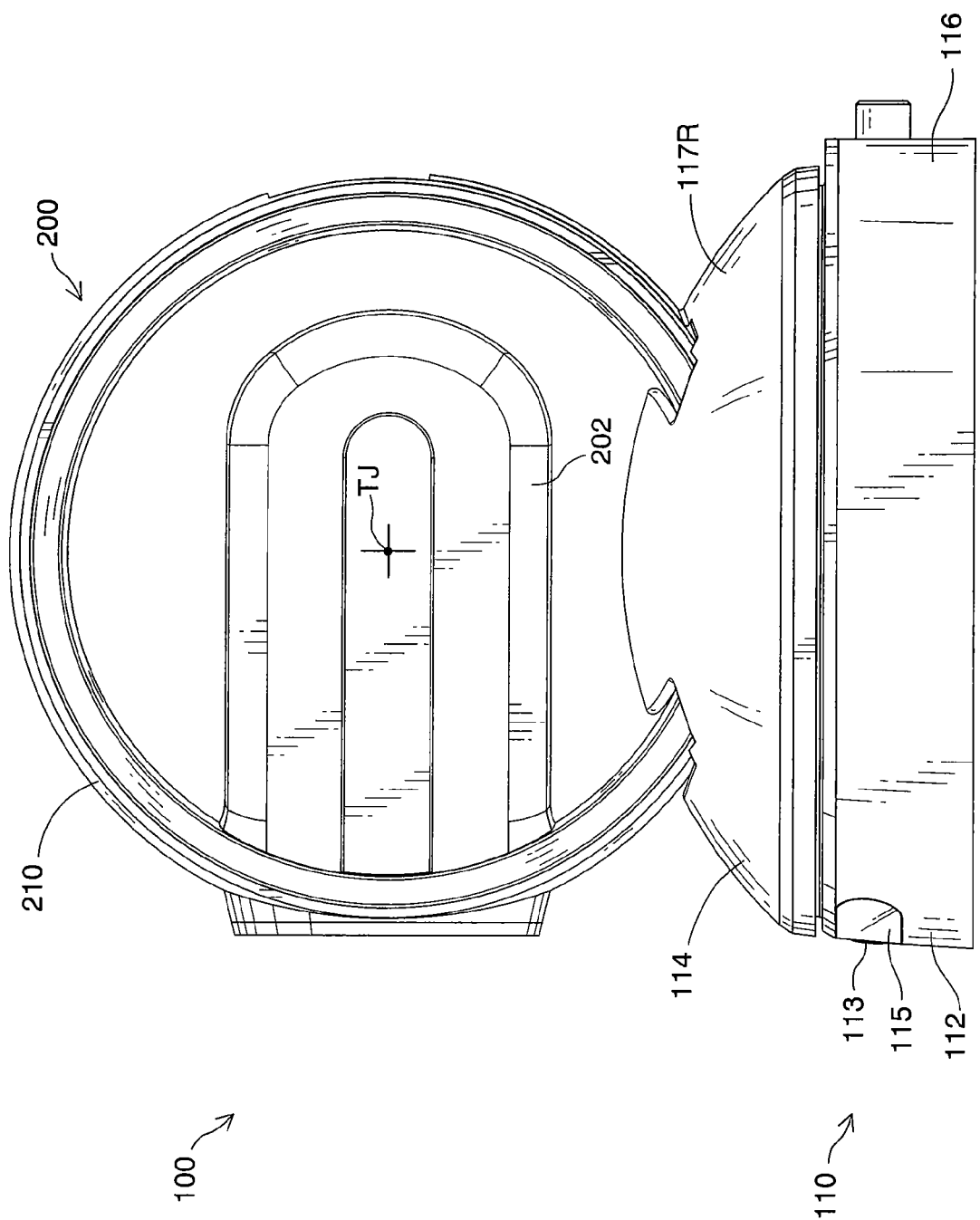
FIG. 2 is a side view showing the imaging apparatus of the embodiment.
Figure 3:
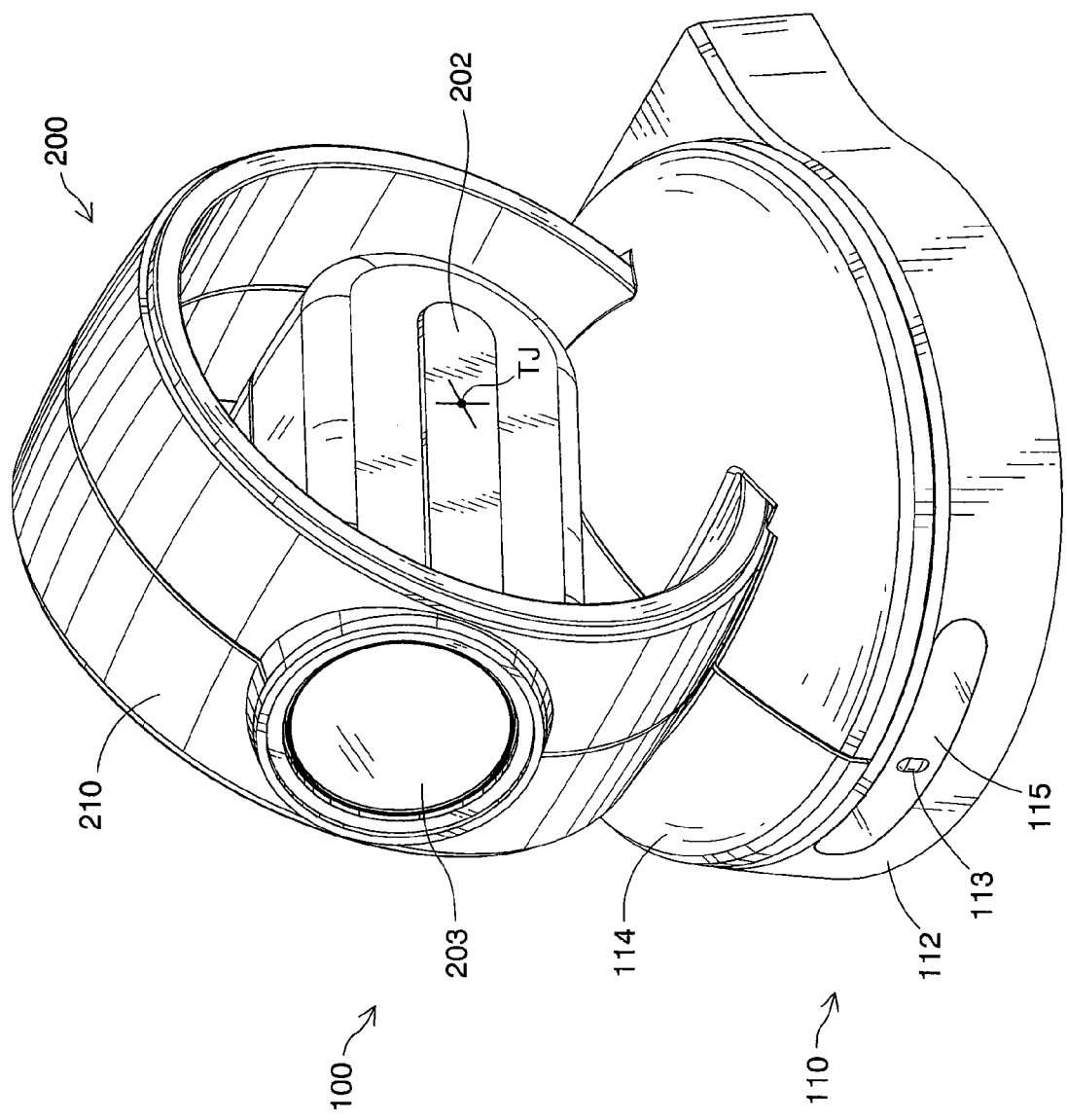
FIG. 3 is a perspective view showing a camera assembly of the imaging apparatus tilted to an upper-most end in a vertical movable range.
Figure 4:
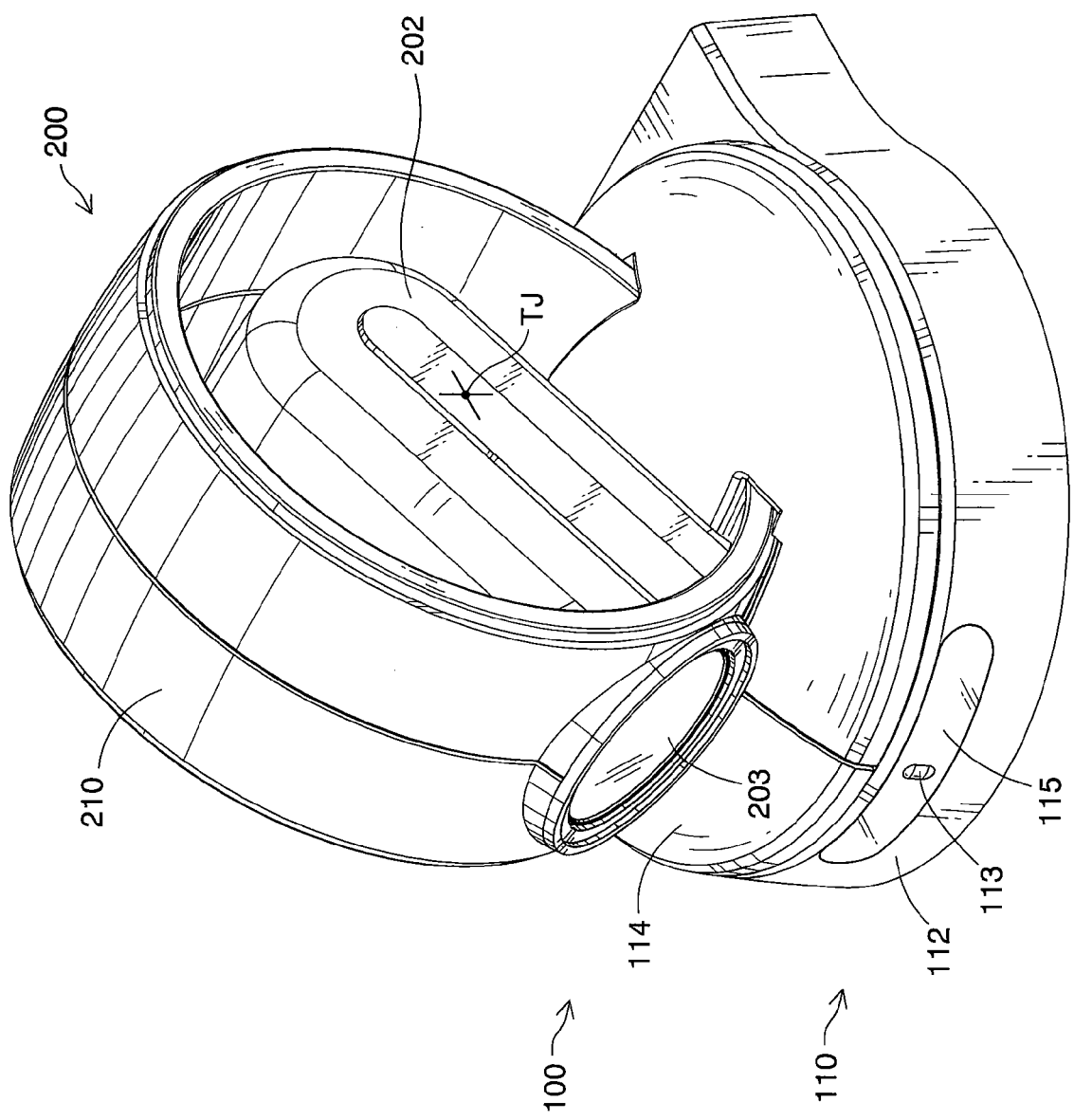
FIG. 4 is a perspective view showing the camera assembly tilted to a lower-most end in the vertical movable range.
Figure 5:
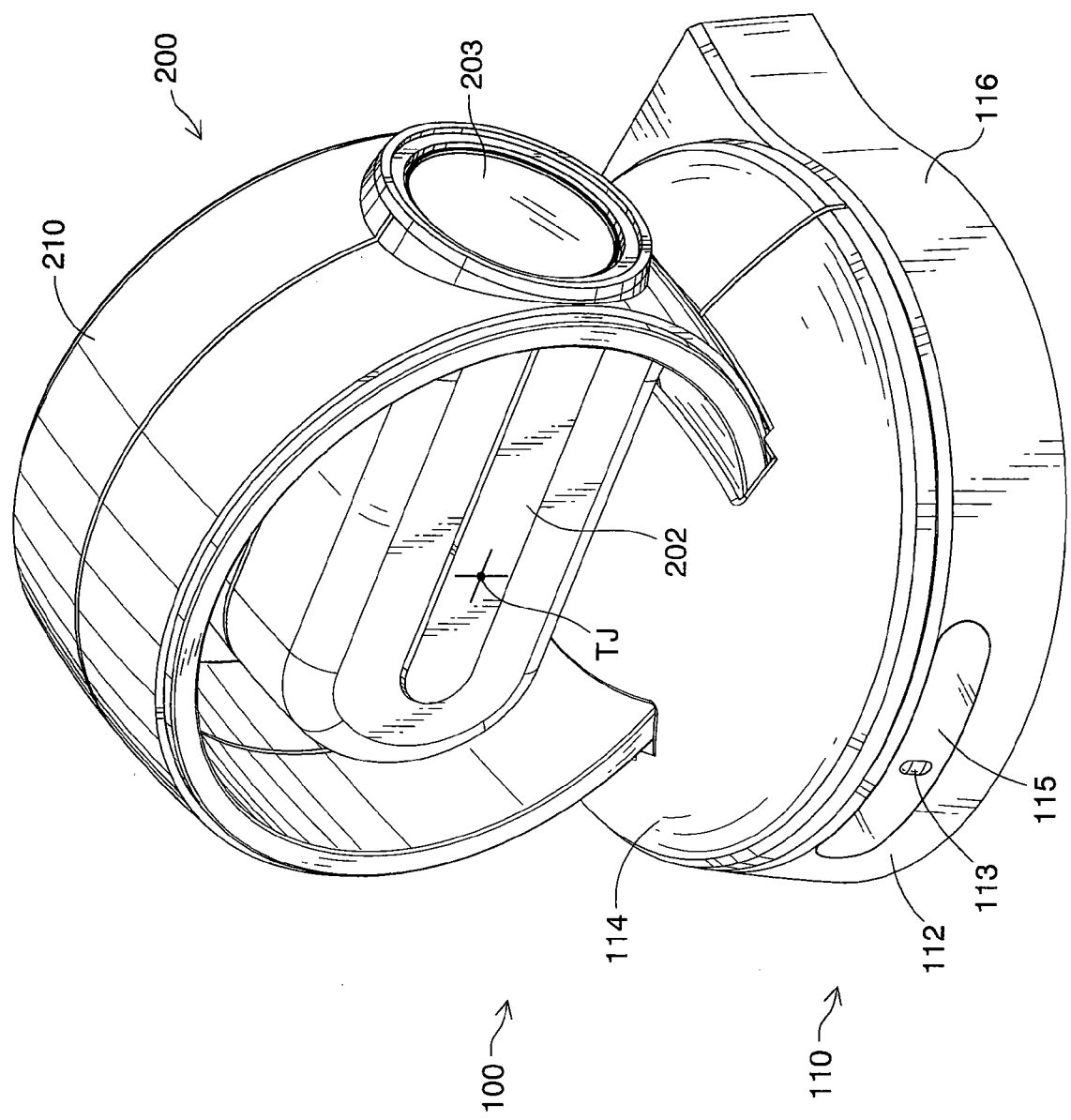
FIG. 5 is a perspective view showing the camera assembly panned to one further-most end in a horizontal movable range.
Figure 6:
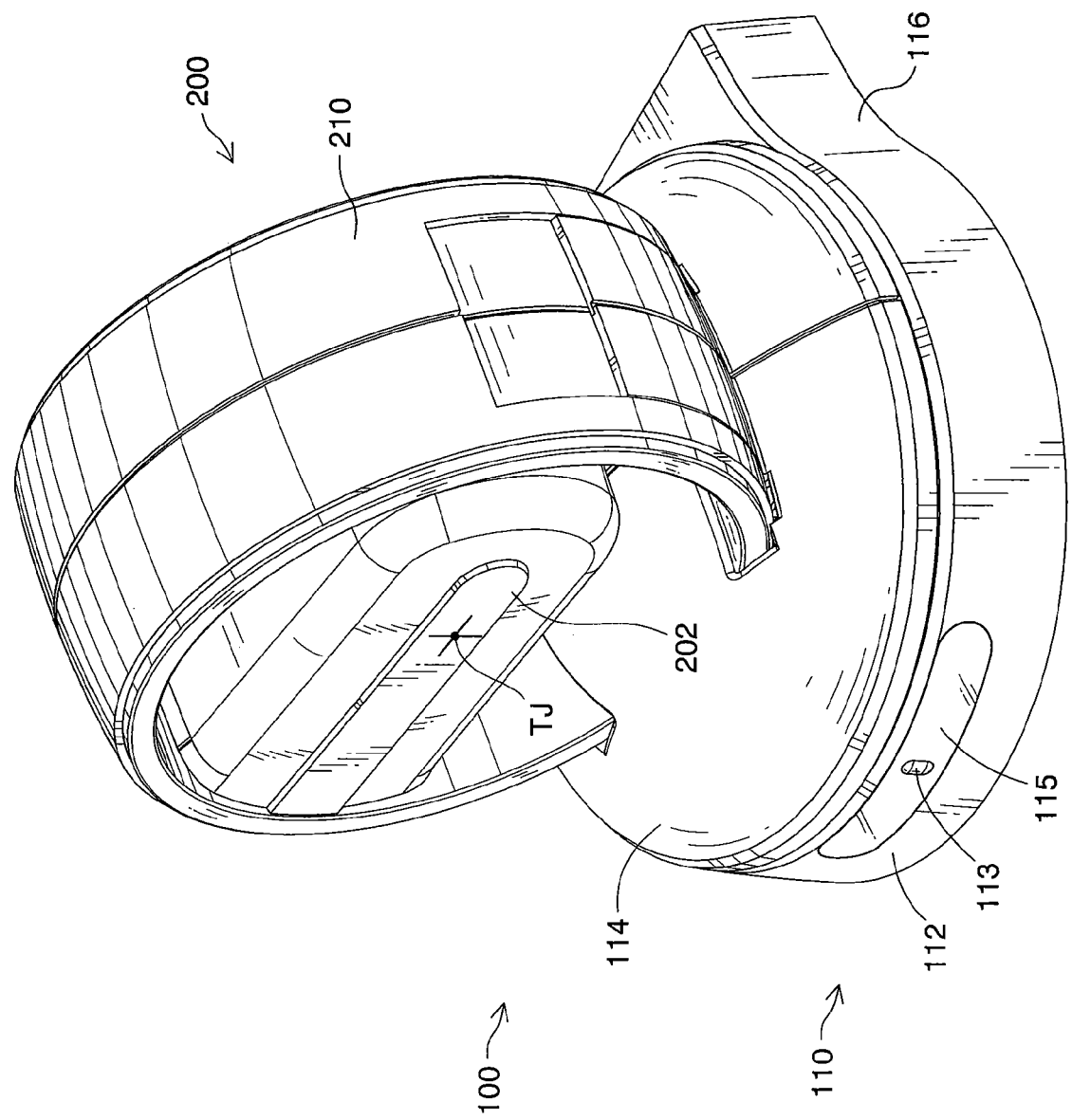
FIG. 6 is a perspective view showing the camera assembly panned to the other further-most end in the horizontal movable range.

One mode of carrying out the invention is described below as a preferred embodiment with reference to the accompanied drawings. The description first regards the general overview and the operations of an imaging apparatus 100 as an application of a security camera in one embodiment of the invention. FIG. 1 is a perspective view showing an imaging apparatus 100 as application of a security camera in one embodiment of the invention. FIG. 2 is a side view showing the imaging apparatus 100 of the embodiment. FIG. 3 is a perspective view showing a camera assembly 200 of the imaging apparatus 100 tilted to an upper-most end in a vertical movable range. FIG. 4 is a perspective view showing the camera assembly 200 tilted to a lower-most end in the vertical movable range. FIG. 5 is a perspective view showing the camera assembly 200 panned to one further-most end in a horizontal movable range. FIG. 6 is a perspective view showing the camera assembly 200 panned to the other further-most end in the horizontal movable range.

With reference to FIGS. 1 through 6, the imaging apparatus 100 is designed to have an extended imaging range as the application of the security camera. The imaging apparatus 100 is tilted to be rotatable in its vertical direction and is panned to be rotatable in its horizontal direction. The imaging apparatus 100 has a base 110 placed on a table or another supporting subject and a camera assembly 200 mounted on the base 110. The base 110 includes a base foot 112 to be directly placed on the supporting subject and an upper assembly fixation structure 114 mounted on the base foot 112. The assembly fixation structure 114 is placed on the base foot 112 to be rotatable relative to the base foot 112 in the horizontal direction by a driving mechanism (described later). The base foot 112 has a side cover 116 that is formed along the whole circumference, and a display element 113 that is located on its front center and uses a light emitting device or LED to show the current driving status of the imaging apparatus 100. The display element 113 is surrounded by an infrared light-receiving element 115. The assembly fixation structure 114 has hemispherical left and right cover splits 117L and 117R that are respectively formed along half the circumference as top-to-side covers. The assembly fixation structure 114 is rotatable together with these cover splits 117L and 117R in the horizontal direction relative to the base foot 112. A rear side of the base foot 112 has a connector area used for signal transmission to and from outside equipment as explained later.

The camera assembly 200 has a doughnut-shaped frame casing 210 and a CCD camera 202. The camera 202 is supported and surrounded by the frame casing 210 to be located in a hollow space formed by the frame casing 210. In the camera assembly 200, an imaging lens 203 of the camera 202 is exposed on the side face of the frame casing 210 to be directed to the outside. The camera assembly 200 is pivotally supported on the assembly fixation structure 114 to be rotatable in the vertical direction relative to the assembly fixation structure 114 as described later. A vertical pivot axis TJ of the camera assembly 200 passes through the inside of the camera assembly 200 in a direction parallel to the width of the frame casing 210. The vertical pivot axis TJ is the central axis of the doughnut-shaped frame casing 210. The vertical pivot axis TJ is arranged on or at least very close to the center of gravity of the camera assembly 200 including the camera 202. In the structure of this embodiment, the frame casing 210 has a certain internal weight W (see FIG. 10) on the opposite side to the camera 202 to locate the vertical pivot axis TJ or the central axis of the doughnut-shaped frame casing 210 on the center of gravity of the camera assembly 200 including the camera 202.

In the imaging apparatus 100 having the base 110 and the camera assembly 200 as described above, the camera assembly 200 including the camera 202 is tilted in the vertical direction from the initial attitude of FIG. 1 in a vertical angle range of approximately 30 degrees as shown in FIGS. 3 and 4. The camera assembly 200 together with the assembly fixation structure 114 is panned in the horizontal direction relative to the base foot 112 from the initial attitude of FIG. 1 in a horizontal angle range of approximately 90 degrees as shown in FIGS. 5 and 6.

Figure 7:
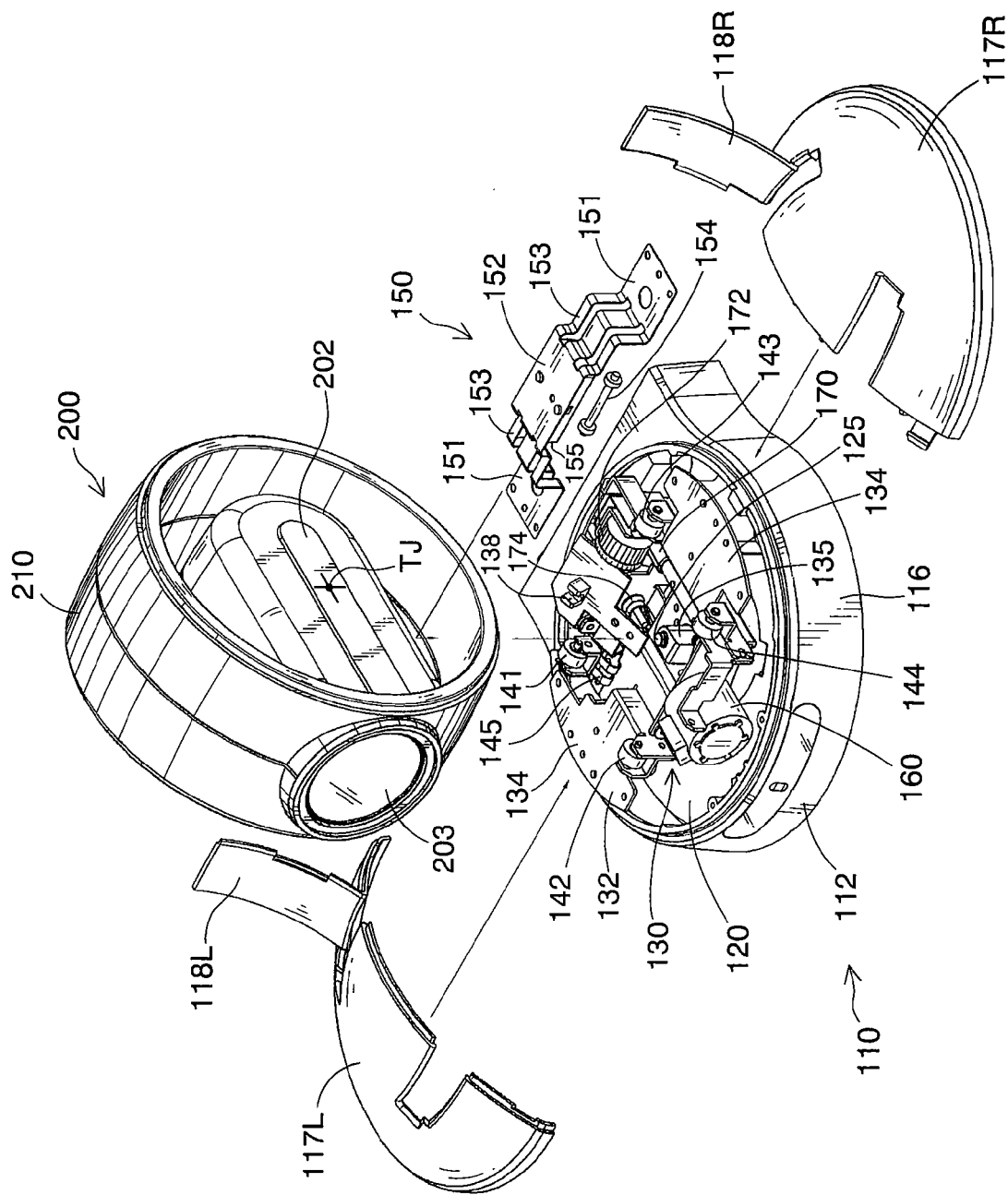
FIG. 7 is a decomposed perspective view showing the pivot support-related structure of a camera assembly and a base in the imaging apparatus of the embodiment.
Figure 8:
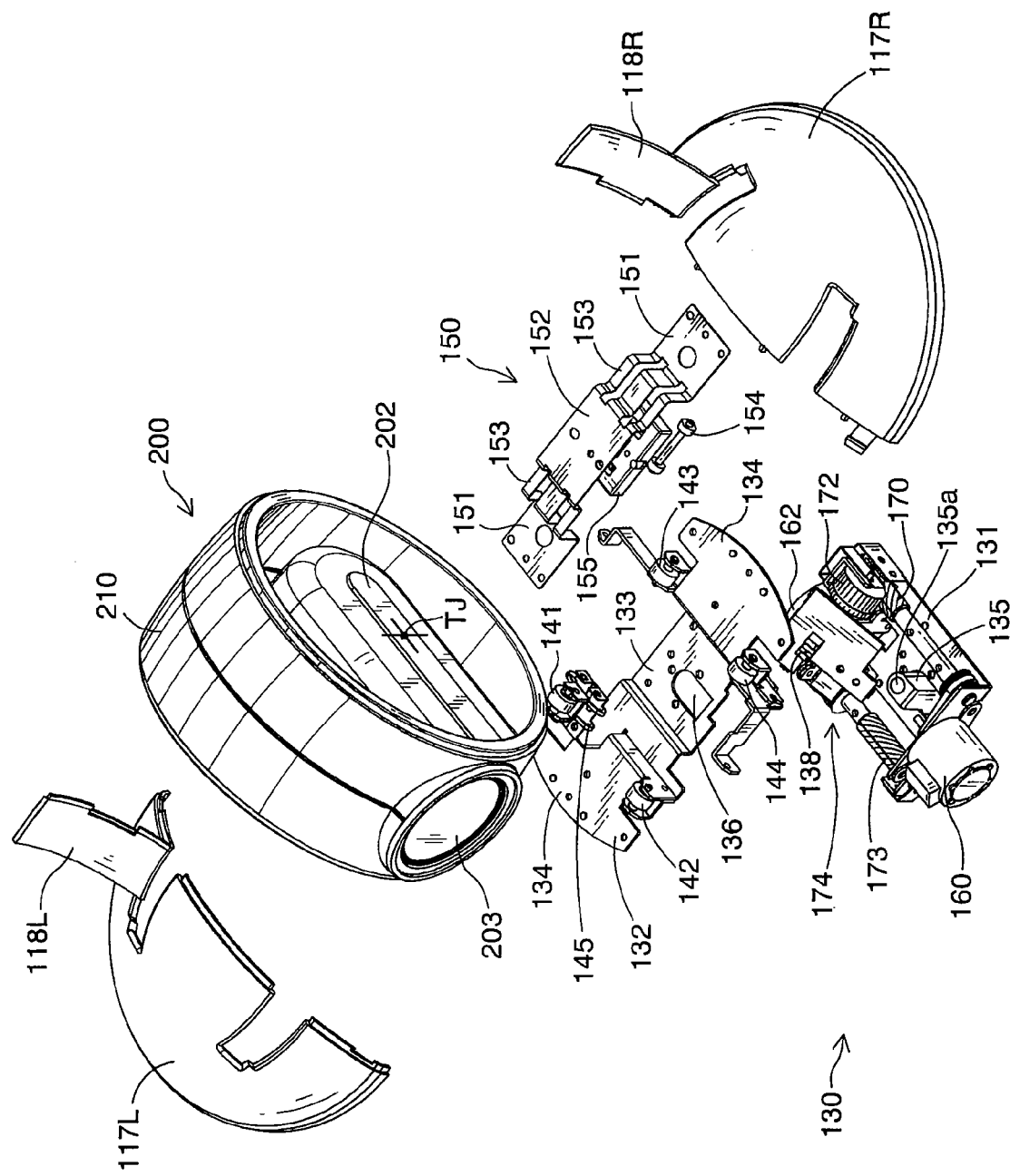
FIG. 8 is a decomposed perspective view showing an assembly fixation structure related to the pivot support of the camera assembly.
Figure 9:
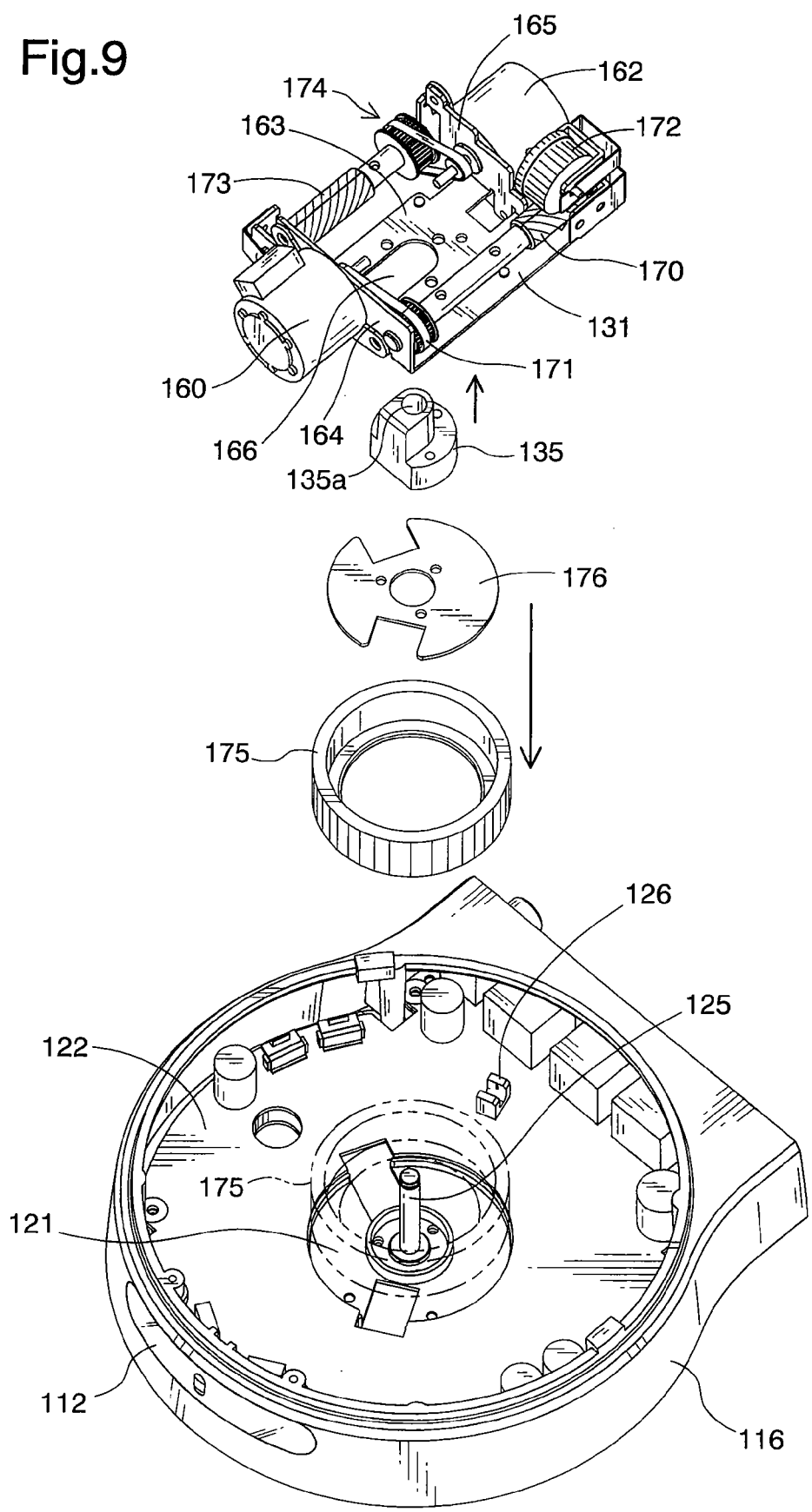
FIG. 9 is a decomposed perspective view showing a main part of panning motion-related construction in the assembly fixation structure of the base.

The following description regards the structure of allowing such tilting and panning motions of the camera assembly 200. FIG. 7 is a decomposed perspective view showing the pivot support-related structure of the camera assembly 200 and the base 110 in the imaging apparatus 100 of the embodiment. FIG. 8 is a decomposed perspective view showing the assembly fixation structure 114 related to the pivot support of the camera assembly 200. FIG. 9 is a decomposed perspective view showing a main part of panning motion-related construction in the assembly fixation structure 114 of the base 110.

With reference to FIGS. 7 through 9, the base foot 112 of the base 110 has a ground plate unit 120 and the side cover 116 surrounding the circumference of the ground plate unit 120. The ground plate unit 120 has a lower ground plate 121 and an upper base plate 122, which are arranged to face each other and are fixed to each other as shown in FIG. 9. The ground plate 121 functions as the skeleton of the base foot 112 of the base 110 and is fixed to the side cover 116 to be directly placed on the surface of the table or the supporting subject via feet or legs (not shown) on its bottom face. The base plate 122 is fixed to the ground plate 121 across a predetermined interval and has various electronic devices on its peripheral area in such a manner that has no interference with a pedestal plate unit 130 described below.

The assembly fixation structure 114 of the base 110 includes the pedestal plate unit 130 and the left and right cover splits 117L and 117R covering over the pedestal plate unit 130. The pedestal plate unit 130 has a lower motor fixation plate 131 and an upper pedestal plate 132, which are arranged perpendicular to each other as shown in FIGS. 7 and 8. The pedestal plate 132 functions as the skeleton of the assembly fixation structure 114 of the base 110 and is related to the pivot support of the camera assembly 200. The pedestal plate 132 is constructed as described below to be involved in the pivot support of the camera assembly 200.

The pedestal plate 132 has a recessed center as a locking plate area 133 and left and right ends as attachment areas 134 for a spring unit 150 (described later). The locking plate area 133 of the pedestal plate 132 has an insertion hole 136 for receiving a pivot shaft fitting element 135 of the motor fixation plate 131 inserted therein. First through fourth rollers 141 through 144 are located on the respective stems of the attachment areas 134 to be protruded upright from the upper faces of the attachment areas 134. The first roller 141 and the second roller 142 are aligned to form one roller array, while the third roller 143 and the fourth roller 144 are aligned to form the other roller array. The roller array of the first roller 141 and the second roller 142 and the roller array of the third roller 143 and the fourth roller 144 respectively support the camera assembly 200 on the side faces of the frame casing 210. The first roller 141 is attached to the pedestal plate 132 via a spring base 145 to be elastically lifted up and down.

Figure 10:
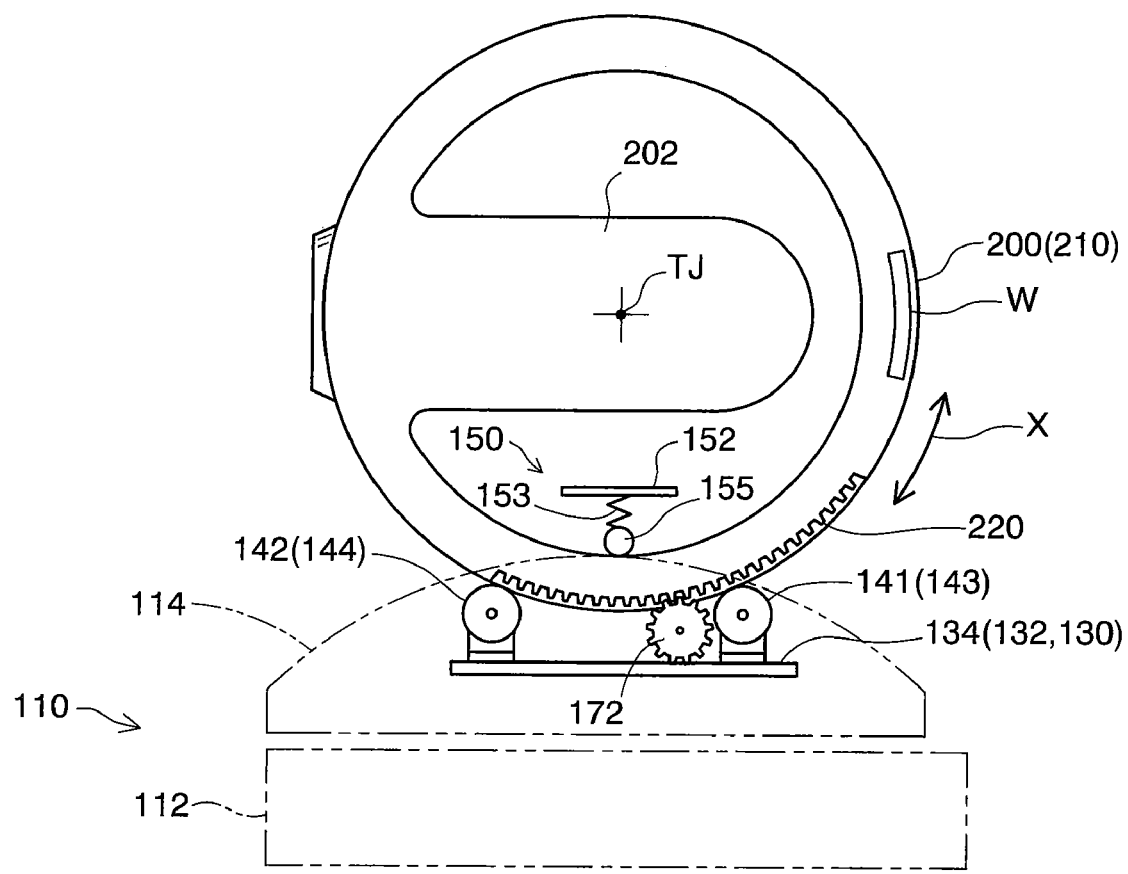
FIG. 10 shows the pivot support of the camera assembly.
Figure 11:
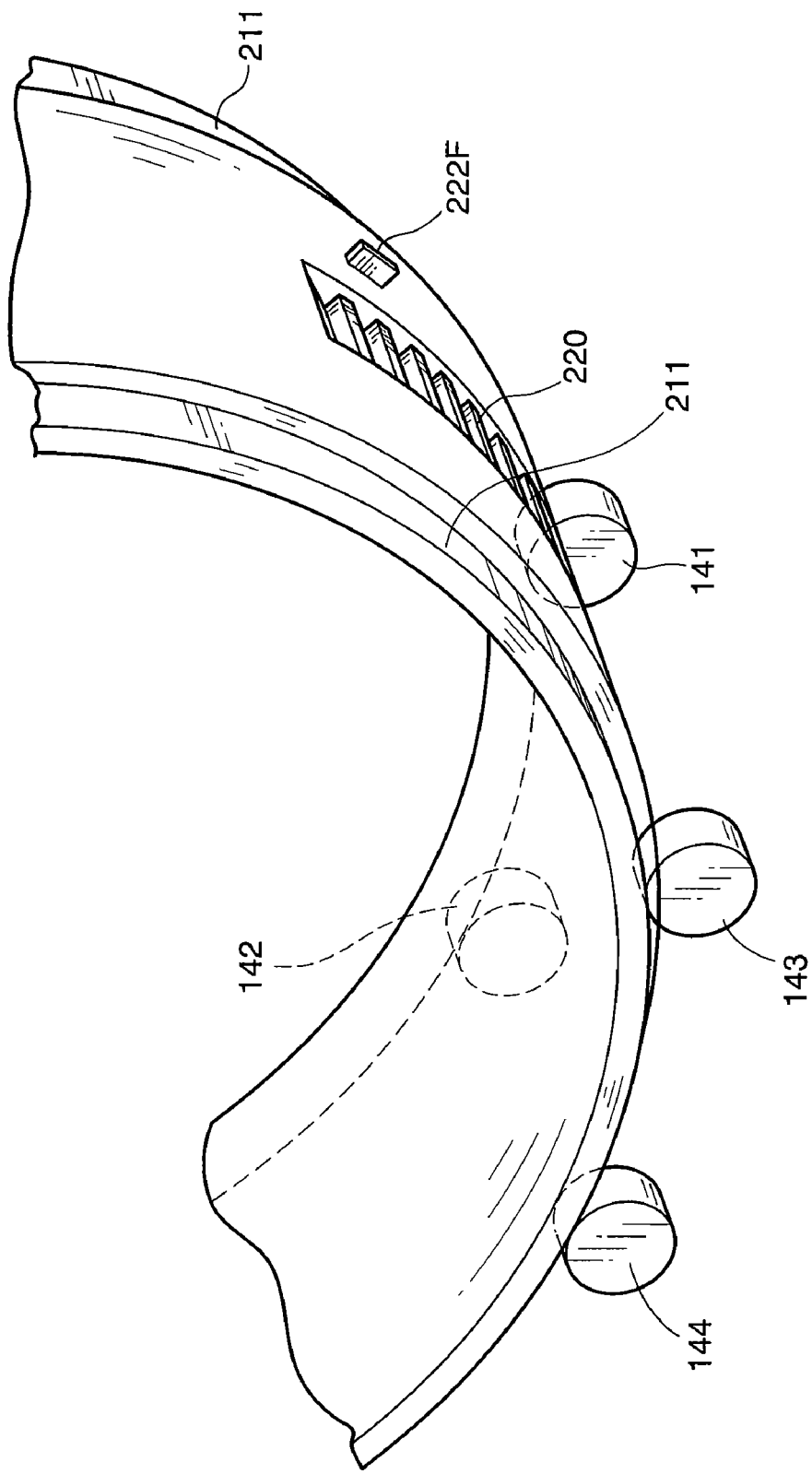
FIG. 11 is a perspective view showing the essential part of the pivot support of the camera assembly.

The spring unit 150 attached to the attachment areas 134 of the pedestal plate 132 includes left and right fixation areas 151 and a central flat plate area 152. The flat plate area 152 is joined with the left and right fixation areas 151 by means of bent spring legs 153 as joints. The spring unit 150 has a pressure roller 154 that is mounted on the rear face of the flat plate area 152 via a roller box 155 to allow free rotations. The spring unit 150 is arranged to be extended across the camera assembly 200 and is fixed to the attachment areas 134 of the pedestal plate 132, so that the pressure roller 154 on the flat plate area 152 presses the inner circumferential faces of the frame casing 210 in the camera assembly 200. The camera assembly 200 is pivotally supported on the pedestal plate unit 130 of the assembly fixation structure 114 of the base 110 as described below. FIG. 10 shows the pivot support of the camera assembly 200. FIG. 11 is a perspective view showing the essential part of the pivot support of the camera assembly 200.

As shown in FIG. 11, the camera assembly 200 has step-like roller contact edges 211 formed along the outer circumference on both sides of the frame casing 210. One of the roller contact edges 211 forms one roller contact circumference in contact with the first roller 141 and the second roller 142 of the roller array. The other roller contact edge 211 forms the other roller contact circumference in contact with the third roller 143 and the fourth roller 144 of the roller array. As shown in FIG. 10, the outer circumferential faces of the frame casing 210 in the camera assembly 200 are supported by the first through the fourth rollers 141 through 144 and are pressed toward the first through the fourth rollers 141 through 144 by means of the spring legs 153 and the pressure roller 154 of the spring unit 150. The camera assembly 200 is thus movable about the vertical pivot axis TJ on the center of the outer circumferential faces of the frame casing 210. In this embodiment, the first through the fourth rollers 141 through 144 on the pedestal plate 132 and the spring unit 150 including the pressure roller 154 form the pivot support structure for supporting the camera assembly 200 on the pedestal plate 132 of the assembly fixation structure 114 of the base 110 to be pivotally movable about the vertical pivot axis TJ of the camera 202 or the central axis passing through the inside of the camera assembly 200 in the direction parallel to the width of the frame casing 210.

The first roller 141 is elastically lifted up and down by the spring base 145. Even when the roller faces of the first rollers 141 through 144 are not completely leveled in the free state, this elastic action enables the camera assembly 200 to be tilted and pivotally movable in the vertical direction without inclination to the left or to the right. The first through the fourth rollers 141 through 144 are in contact with the step-like roller contact edges 211 formed along the outer circumference on both sides of the frame casing 210. This structure effectively prevents the leftward or rightward positional displacement during the tilting motion of the camera assembly 200. The first through the fourth rollers 141 through 144 and the spring unit 150 are covered with the left and right cover splits 117L and 117R fixed to the pedestal plate 132. The left and right cover splits 117L and 117R respectively have curved projections 118L and 118R that are protruded from the top faces of the cover splits 117L and 117R and are extended along the rear circumferential face of the camera assembly 200.

The following description regards the driving source for the tilting and panning motions of the camera assembly 200 and a relevant driving force transmission mechanism. In the pedestal plate unit 130 of the base 110, a tilting motor 160 and a panning motor 162 are set on the motor fixation plate 131. The tilting motor 160 and the panning motor 162 are both servo motors and are rotated in the normal direction or in the reverse direction according to the input number of pulses.

As shown in FIGS. 8 and 9, the motor fixation plate 131 fixed to the pedestal plate 132 of the pedestal plate unit 130 is U-shaped and includes a mounting plate 163 and two upright motor attachment plates 164 and 165 that are located on both ends of the mounting plate 163 to face each other across the mounting plate 163. The tilting motor 160 is attached to the motor attachment plate 164 in the illustrated attitude to have its output shaft in the horizontal direction. The panning motor 162 is attached to the other motor attachment plate 165 in the illustrated attitude to have its output shaft in the horizontal direction.

A driving force transmission mechanism is built in each of the motor attachment plates 164 and 165 to transmit the driving force of the corresponding motor 160 or 162. A tilting worm gear shaft 170 for the tilting motion is supported in a freely rotatable manner on one end of the motor fixation plate 131. The driving force of the tilting motor 160 is transmitted through a pulley-timing belt transmission mechanism 171 to the tilting worm gear shaft 170. The tilting worm gear shaft 170 has threads engaging with teeth of a tilting rotation gear 172. The driving force of the tilting motor 160 is thus transmitted to the tilting rotation gear 172 via the transmission mechanism 171 and the tilting worm gear shaft 170. The tilting rotation gear 172 rotates in the normal direction or in the reverse direction with the rotation of the tilting motor 160.

The tilting rotation gear 172 engages with a mating element of the camera assembly 200. As shown in FIGS. 10 and 11, the camera assembly 200 has an arc-shaped frame gear train 220 formed along the outer circumference of the frame casing 210 about the vertical pivot axis TJ. In the pivot support state of the camera assembly 200 by means of the first through the fourth rollers 141 through 144 and the spring unit 150, the arc-shaped frame gear train 220 engages with the tilting rotation gear 172. The driving force of the tilting motor 160 goes through the transmission mechanism 171, the tilting worm gear shaft 170, the tilting rotation gear 172, and the arch-shaped frame gear train 220 and is eventually transmitted along the outer circumference of the frame casing 210 about the vertical pivot axis TJ to the camera assembly 200 as the power for the pivotal motions of the camera 202. The transmission mechanism 171, the tilting worm gear shaft 170, the tilting rotation gear 172, and the arch-shaped frame gear train 220 constitute the vertical rotation transmission unit of the invention. The camera assembly 200 including the camera 202 is rotated in the normal direction or in the reverse direction about the vertical pivot axis TJ as shown by a two-headed arrow X in FIG. 10.

The mounting plate 163 of the motor fixation plate 131 has an insertion hole 166 of an identical shape with the shape of the insertion hole 136 formed in the locking plate area 133 of the pedestal plate 132. The insertion hole 166 is located between the two motor attachment plates 164 and 165. The pivot shaft fitting element 135 is inserted through and fitted in the insertion hole 136 of the pedestal plate 132 and the insertion hole 166 of the motor fixation plate 131 in the pedestal plate unit 130. The pivot shaft fitting element 135 has a through hole 135a to receive a horizontal pivot shaft 125 inserted therein. The horizontal pivot shaft 125 is protruded from the ground plate 121 included in the base foot 112 of the base 110. The pivot shaft fitting element 135 enables the pivot support of the motor fixation plate 131 and the pedestal plate 132 and thereby the whole pedestal plate unit 130 about the horizontal pivot shaft 125. The pivot shaft fitting element 135 supports the pedestal plate unit 130 including the motor fixation plate 131 and the pedestal plate 132 to allow the rotation of the pedestal plate unit 130 in the horizontal direction relative to the ground plate 121 of the base foot 112. The tilting motor 160 and the panning motor 162 respectively attached to the motor attachment plates 164 and 165 are arranged in the attitude having the respective output shafts in the horizontal direction and are disposed to face each other across the pivot shaft fitting element 135 in the pedestal plate unit 130. The assembly fixation structure 114 including the pedestal plate unit 130 with the tilting motor 160 and the panning motor 162 is one part of the base 110. Namely the base 110 has the built-in tilting motor 160 and the built-in panning motor 162.

As shown in FIGS. 8 and 9, a panning worm gear shaft 173 for the panning motion is supported in a freely rotatable manner on the other end of the motor fixation plate 131. The driving force of the panning motor 162 is transmitted through a pulley-timing belt transmission mechanism 174 to the panning worm gear shaft 173. The panning worm gear shaft 173 has threads engaging with teeth of a panning rotation gear 175 provided in the base foot 112. The panning rotation gear 175 is fixed to the ground plate 121 of the base foot 112 to be concentric with the horizontal pivot shaft 125 protruded from the ground plate 121 as shown in FIG. 9. A fitting plate 176 is used for fixation of the panning rotation gear 175 to the ground plate 121.

The panning rotation gear 175 fixed to the ground plate 121 is interposed between the ground plate 121 and the pedestal plate unit 130 supported via the pivot shaft fitting element 135. The teeth formed on the outer circumference of the panning rotation gear 175 engage with the threads on the panning worm gear shaft 173 of the motor fixation plate 131 in the pedestal plate unit 130, which is supported on the ground plate 121 via the pivot shaft fitting element 135 to be rotatable in the horizontal direction. The driving force of the panning motor 162 placed on the motor fixation plate 131 of the pedestal plate unit 130 is accordingly transmitted to the panning rotation gear 175 by means of the transmission mechanism 174 and the panning worm gear shaft 173.

The panning rotation gear 175 is fixed to the ground plate 121, while the pedestal plate unit 130 is rotatable about the horizontal pivot shaft 125 relative to the ground plate 121. With the rotation of the panning motor 162, the pedestal plate unit 130 rotates in the horizontal direction about the panning rotation gear 175, that is, about the horizontal pivot shaft 125. The driving force of the panning motor 162 is thus transmitted to the pedestal plate unit 130 and thereby to the panning rotation gear 175 as the power for the horizontal pivotal motions of the camera assembly 200 supported on the pedestal plate unit 130. The rotation of the pedestal plate unit 130 about the panning rotation gear 175 accompanied with the rotation of the panning motor 162 changes the position of the panning rotation gear 175 relative to the pedestal plate unit 130 about the horizontal pivot shaft 125, while not changing the position of the panning rotation gear 175 relative to the ground plate 121 about the horizontal pivot shaft 125.

The camera assembly 200 has an additional structure involved in the tilting and panning motions of the camera 202. The base foot 112 of the base 110 is placed on the table or another supporting subject and is not rotated in the horizontal direction. A panning motion sensor 126 (see FIG. 9) is provided on the base plate 122 to specify a forward end and a backward end of the horizontal pivotal motion of the assembly fixation structure 114 with the camera assembly 200. The panning motion sensor 126 has a proximity sensor placed in its opening. A forward end detection piece 129F (see FIG. 12) for detecting the forward end of the panning motion and a backward end detection piece 129B (see FIG. 12) for detecting the backward end of the panning motion are formed on the bottom of the pedestal plate 132 in the pedestal plate unit 130. The panning motion sensor 126 outputs a signal representing the forward end of the panning motion or a signal representing the backward end of the panning motion, in response to insertion of the corresponding detection piece 129F or 129B into the opening. A tilting motion sensor 138 (see FIG. 7) is provided on the pedestal plate 132 of the pedestal plate unit 130 included in the assembly fixation structure 114 of the base 110, which supports the camera assembly 200 to allow the tilting motions or the vertical pivotal motions. The tilting motion sensor 138 has a proximity sensor placed in its opening. The tilting motion sensor 138 outputs a signal representing a forward end of the tilting motion or a signal representing the backward end of the tilting motion, in response to insertion of a forward end detection piece 222F or a backward end detection piece 222B formed on the frame casing 211 of the camera assembly 200 (see FIG. 11).

Figure 12:
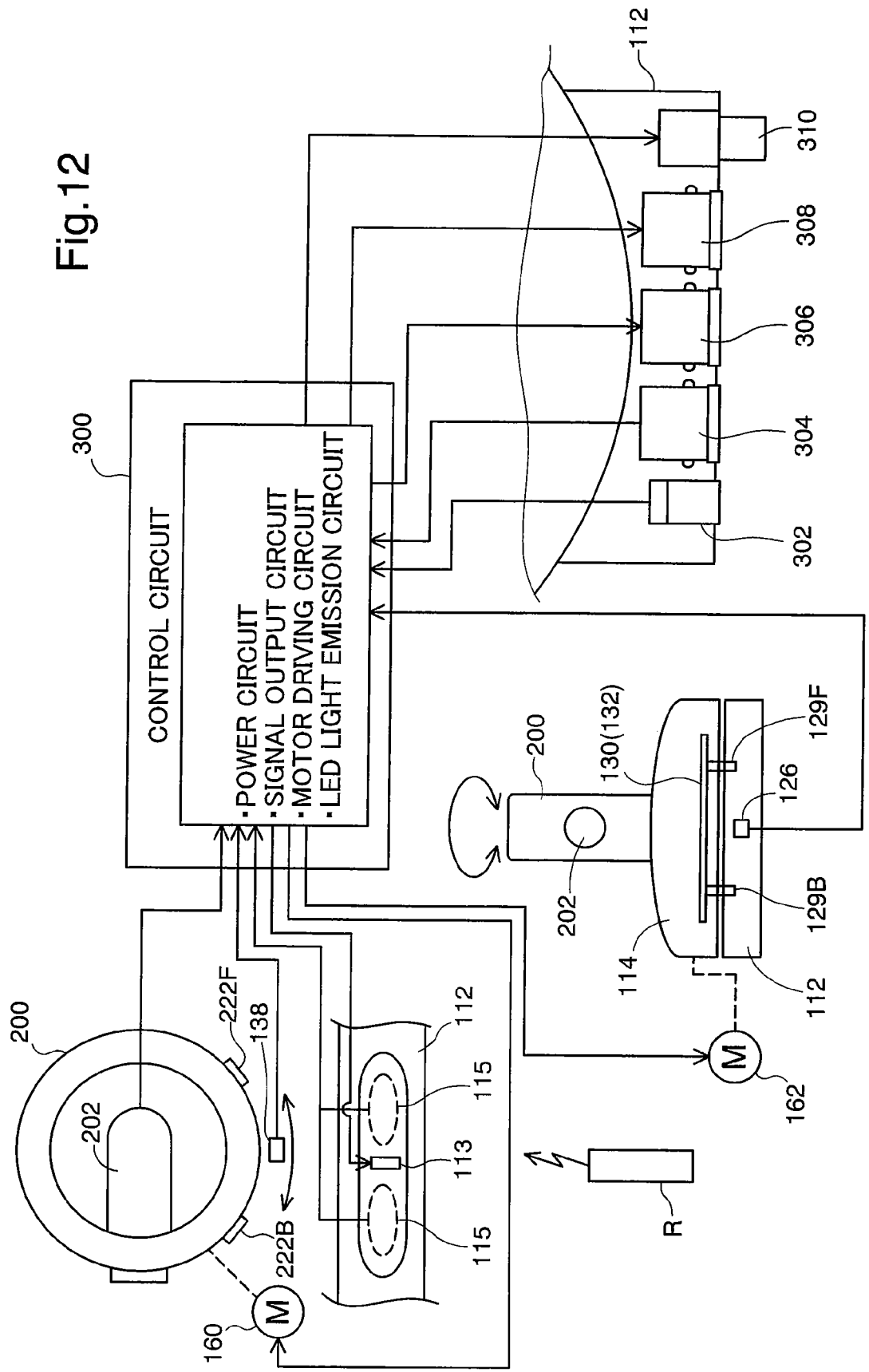
FIG. 12 is a block diagram schematically illustrating the electrical configuration of the imaging apparatus of the embodiment.

FIG. 12 is a block diagram schematically illustrating the electrical configuration of the imaging apparatus 100 of the embodiment. The imaging apparatus 100 has a controller 300 to control the operations of the whole imaging apparatus 100. The controller 300 is a computer system including a CPU, a ROM, and a RAM and is connected with an outside integrated control unit and various monitor units to allow signal transmission. The imaging apparatus 100 has a dc (direct current) source connector 302, an input connector 304 and an output connector 306 to receive and send control signals (signals in conformity with the RS-232C standard) from and to the integrated control unit, a video signal (S video signal) output connector 308, and a video signal (RCA signal) output connector 310 at the rear end of the base foot 112. The controller 300 is connected with these connectors 302 to 310.

The controller 300 works as, for example, a power circuit, a video signal output circuit, a motor driving circuit, and an LED light emission circuit. The power circuit controls application of a dc voltage supplied via the dc source connector 302 to the camera 202 and the motors 160 and 162. The video signal output circuit controls output of imaging signals taken by the camera 202 to the outside via the S video signal output connector 308 and the RCA signal output connector 310. The motor driving circuit drives the tilting motor 160 and the panning motor 162 in response to signals from the infrared light-receiving element 115 receiving infrared signals from a remote control R or in response to control signals input via the input connector 304 and controls the tilting motions and the panning motions of the camera 202. The LED light emission circuit controls on and off the display on the display unit 113 in response to power on and off signals. The electronic devices of the control circuit 300 are placed on the periphery of the base plate 122 of the base foot 112 to have no interference with the horizontal pivotal motions of the pedestal plate unit 130 as mentioned previously.

The imaging apparatus 100 of the embodiment has the following advantages. In the imaging apparatus 100 of the embodiment, the tilting motor 160 as the driving source for the tilting motions of the camera 202 of the camera assembly 200 is located on the pedestal plate unit 130 of the assembly fixation structure 114 of the base 110. The camera 202 is surrounded by the frame casing 210 to have the imaging lens 203 exposed on the side face of the frame casing 210 and directed to the outside. The driving force transmission mechanism of the tilting motor 160 for the tilting motions of the camera 202 is separated from the pivot support-related structure to allow the tilting motions of the camera assembly 200 including the camera 202.

The transmission mechanism 171, the tilting worm gear shaft 170, and the tilting rotation gear 172 involved in transmission of the driving force of the tilting motor 160 are built in the assembly fixation structure 114 of the base 110 (more specifically set on the motor fixation plate 131 of the pedestal plate unit 130), independently of the pivot support-related structure of the camera assembly 200. The arc-shaped frame gear train 220 (see FIGS. 10 and 11) formed along the outer circumference of the doughnut-shaped frame casing 210 of the camera assembly 200 engages with the tilting rotation gear 172 formed on the pedestal plate unit 130 for transmission of the driving force of the tilting motor 160. The camera assembly 200 including the doughnut-shaped frame casing 210 is pivotally supported to allow the tilting motions about the vertical pivot axis TJ. The first through the fourth rollers 141 through 144 and the spring unit 150 involved in the pivot support are built in the assembly fixation structure 114 of the base 110 (more specifically set on the pedestal plate 132 of the pedestal plate unit 130), independently of the above elements involved in transmission of the driving force. The rollers 141 through 144 allow the pivotal rotations or the tilting motions of the camera assembly 200.

In the imaging apparatus 100 of the embodiment described above, the camera assembly 200 is pivotally supported on the assembly fixation structure 114 of the base 110 by means of the first through the fourth rollers 141 through 144 and the spring unit 150 provided in the assembly fixation structure 114, so as to allow the tilting motions of the camera assembly 200 including the camera 202. This pivot support is thus effectuated on the side of the assembly fixation structure 114. In this imaging apparatus 100 of the embodiment, neither the pivot support-related elements for the pivot support of the camera assembly 200 on the base 110 about the vertical pivot axis TJ nor the elements involved in transmission of the driving force are located over the side faces of the frame casing 210 in the camera assembly 200. This arrangement desirably accomplishes the space-saving on the side faces of the camera assembly 200. As shown in FIGS. 1 through 6, only the lower portion of the camera assembly 200 is pivotally supported and mounted on the base 110, so that the camera assembly 200 is mostly exposed to the outside and has the free lateral space.

The first through the fourth rollers 141 through 144 and the spring unit 150 provided in the assembly fixation structure 114 pivotally support the camera assembly 200 on the circumferential faces of the frame casing 210. The central axis of the doughnut-shaped frame casing 210 of the camera assembly 200 is the vertical pivot axis TJ. The vertical pivot axis TJ is arranged on or at least very close to the center of gravity of the camera assembly 200 that is vertically rotatable to allow the tilting motions of the camera 202. The driving force for the tilting motions is transmitted via the arc-shaped frame gear train 220 to the camera assembly 200. This arrangement for the driving force transmission enables a decrease in motor torque required for the tilting motions of the camera assembly 200. The decreasing motor torque reduces the required power of the tilting motor 160 and accordingly has the downsizing and space-saving effects on the tilting motor 160 and the whole imaging apparatus 100. In the structure of this embodiment, the vertical pivot axis TJ is located on the center of gravity of the camera assembly 200. This keeps the transmission moment of the driving force practically constant in the course of transmission of the driving force of the tilting motor 160 to the camera assembly 200 via the arc-shaped frame gear train 220. The structure of the embodiment thus stabilizes the tilting motions of the camera assembly 200, in addition to the reduction of the required motor torque.

The engagement of the arc-shaped frame gear train 220 formed along the outer circumference of the frame casing 210 with the tilting rotation gear 172 is utilized for transmission of the driving force to the camera assembly 200. This arrangement desirably enhances the reliability of the driving force transmission and thereby the reliability of the tilting operations of the camera assembly 200 including the camera 202. The camera assembly 200 is pressed against the first through the fourth rollers 141 through 144 by means of the spring unit 150, so as to ensure the secure engagement of the arc-shaped frame gear train 220 with the tilting rotation gear 172. This also assures the stable tilting motions of the camera assembly 200 including the camera 202.

In the pivot support of the camera assembly 200 on the assembly fixation structure 114, the camera assembly 200 is allowed to have rolling motions by the first through the fourth rollers 141 through 144 built in the assembly fixation structure 114, while being pressed against the first through the fourth rollers 141 through 144 by the spring unit 150 built in the assembly fixation structure 114. The camera assembly 200 is thus stably rotatable on the first through the fourth rollers 141 through 144. This ensures stable tilting motions of the camera assembly 200 including the camera 202. The first roller 141 is elastically lifted up and down by the spring base 145. This elastic action enables the camera assembly 200 to be tilted and pivotally movable in the vertical direction without inclination to the left or to the right. The camera 202 can thus be positioned just in front of a subject for imaging.

The first through the fourth rollers 141 through 144 are arranged to be in contact with the step-like roller contact edges 211 formed along the outer circumference on both sides of the frame casing 210. This structure effectively prevents the leftward or rightward positional displacement during the tilting motion of the camera assembly 200. This arrangement is also advantageous for positioning the camera 202 just in front of a subject for imaging.

In the imaging apparatus 100 of the embodiment, the camera assembly 200 including the camera 202 is vertically movable to have the tilting motions and is also horizontally movable to have the panning motions. As the panning motion-related structure, the base 110 as the object of the pivot support of the camera assembly 200 has the assembly fixation structure 114 separately formed with the base foot 112, which is placed on the table or another supporting subject. The base foot 112 has the ground plate 121 that is directly placed on the surface of the table or another supporting subject. The assembly fixation structure 114 has the pedestal plate unit 130. The tilting motor 160 as the driving source of the tilting motions and the panning motor 162 as the driving source of the panning motions are both located on the motor fixation plate 131 of the pedestal plate unit 130. The pedestal plate unit 130 also includes the pivot shaft fitting element 135 that attains the pivot support of the pedestal plate unit 130 on the ground plate 121 to allow the rotation of the pedestal plate unit 130 in the horizontal direction relative to the ground plate 121, and the transmission mechanisms 171 and 174 and the other relevant elements that are involved in transmission of the driving forces of the tilting motor 160 and the panning motor 162. The panning rotation gear 175 for transmission of the driving force of the panning motor 162 is set on the ground plate 121 to be located between the pedestal plate unit 130 and the ground plate 121 connected by means of the pivot shaft fitting element 135. The panning rotation gear 175 is fixed to the ground plate 121. This arrangement changes the position of the panning rotation gear 175 relative to the pedestal plate unit 130 about the horizontal pivot shaft 125.

This panning motion-related structure enables the camera assembly 200 to be rotated in the horizontal direction integrally with the assembly fixation structure 114 including the pedestal plate unit 130 relative to the base foot 112 including the ground plate 121. The camera assembly 200 including the camera 202 is thus rotatable both in the vertical direction to be tilted and in the horizontal direction to be panned. The tilting motor 160 and the panning motor 162 as the driving sources of the tilting motions and the panning motors of the camera 202, as well as the transmission mechanisms 171 and 174 and the other relevant elements for the driving force transmission are collectively arranged in the assembly fixation structure 114 of the base 110.

The panning motor 162, the transmission mechanism 174, and the panning worm gear shaft 173 involved in the panning motions of the camera assembly 200 are independent of the pivot support structure for the pivot support of the camera assembly 200 on the pedestal plate unit 130 and of the tilting motion-related structure for the tilting motions of the camera assembly 200. The panning motion-related structure accordingly does not affect the pivot support structure or the driving force transmission structure for the tilting motions of the camera assembly 200. This arrangement desirably exerts the space-saving effect in the periphery of the camera assembly 200 and ensures the smooth tilting and panning motions of the camera 202 set in the camera assembly 200.

The tilting motion-related structure and the panning motion-related structure for the tilting motions and the panning motions of the camera assembly 200 are collectively provided in the pedestal plate unit 130. In this concentrated arrangement, the panning rotation gear 175 is set on the ground plate 121 of the base foot 112 to be located between the pedestal plate unit 130 and the ground plate 121. The panning rotation gear 175 accordingly does not restrict the concentrated arrangement in the pedestal plate unit 130. In the imaging apparatus 100 of the embodiment, the concentrated arrangement in the pedestal plate unit 130 enables the two driving sources for the tilting motions and for the panning motions to be located on substantially the same plane in the horizontal direction. This has the space-saving effect on the pedestal plate unit 130 and enables downsizing of the whole imaging apparatus 100.

The tilting motor 160 and the panning motor 162 are arranged in the attitude having the respective output shafts in the horizontal direction and are placed to face each other across the pivot shaft fitting element 135 on the motor fixation plate 131 of the pedestal plate unit 130 (see FIGS. 7 through 9). This arrangement of the motors 160 and 162 gives the good weight balance to the pedestal plate unit 130 and accordingly stabilizes the panning motions of the camera assembly 200. The motor generally has the greater length in the direction of the output shaft than the length in the direction perpendicular to the output shaft. The arrangement of the two motors 160 and 162 on the horizontal plane in the attitude having the respective output shafts in the horizontal direction accordingly has the space-saving effect. This concentrated arrangement contributes to the further downsizing of the base 110.

Figure 13:
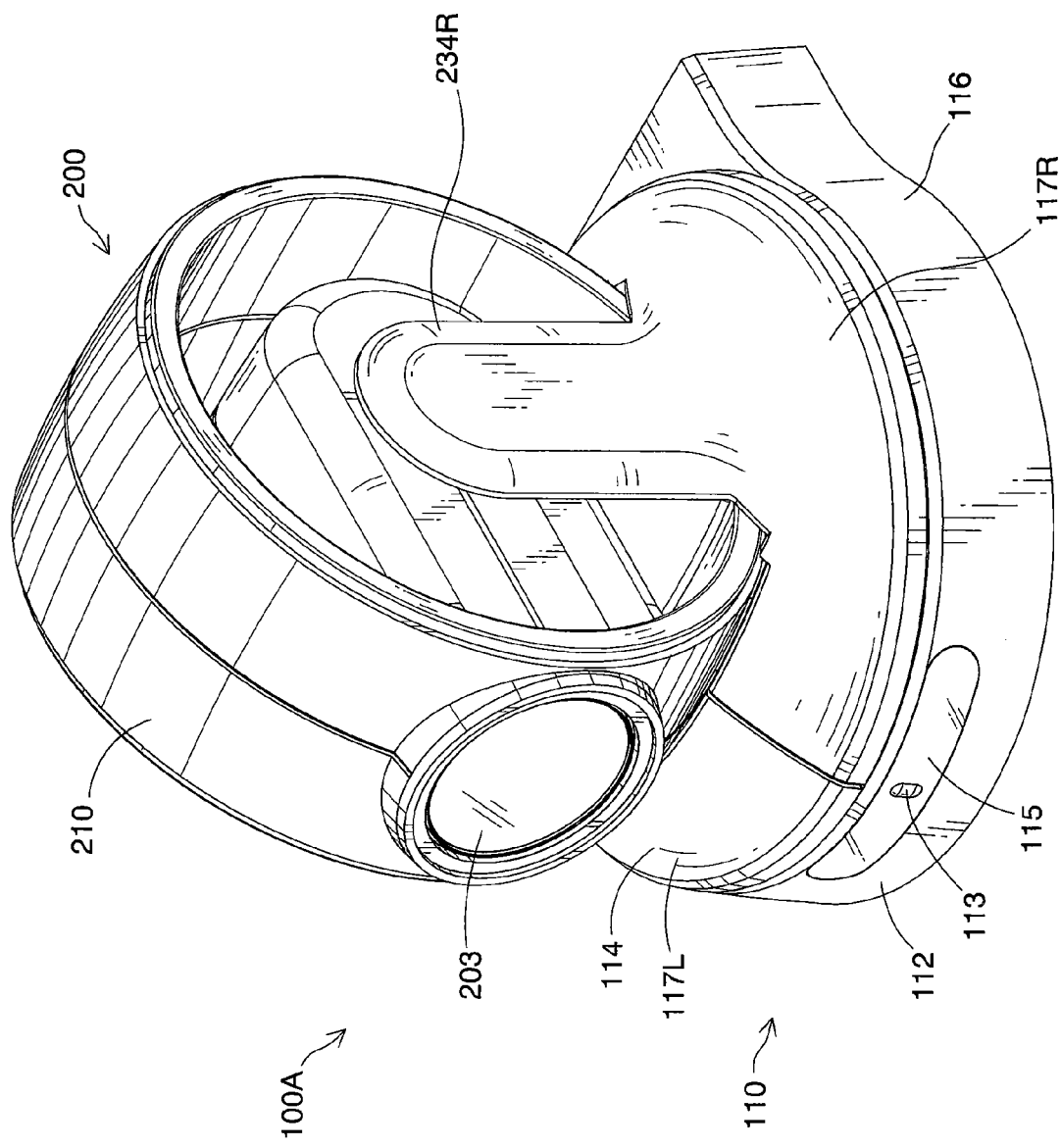
FIG. 13 is a perspective view showing an imaging apparatus in a first modified example.
Figure 14:
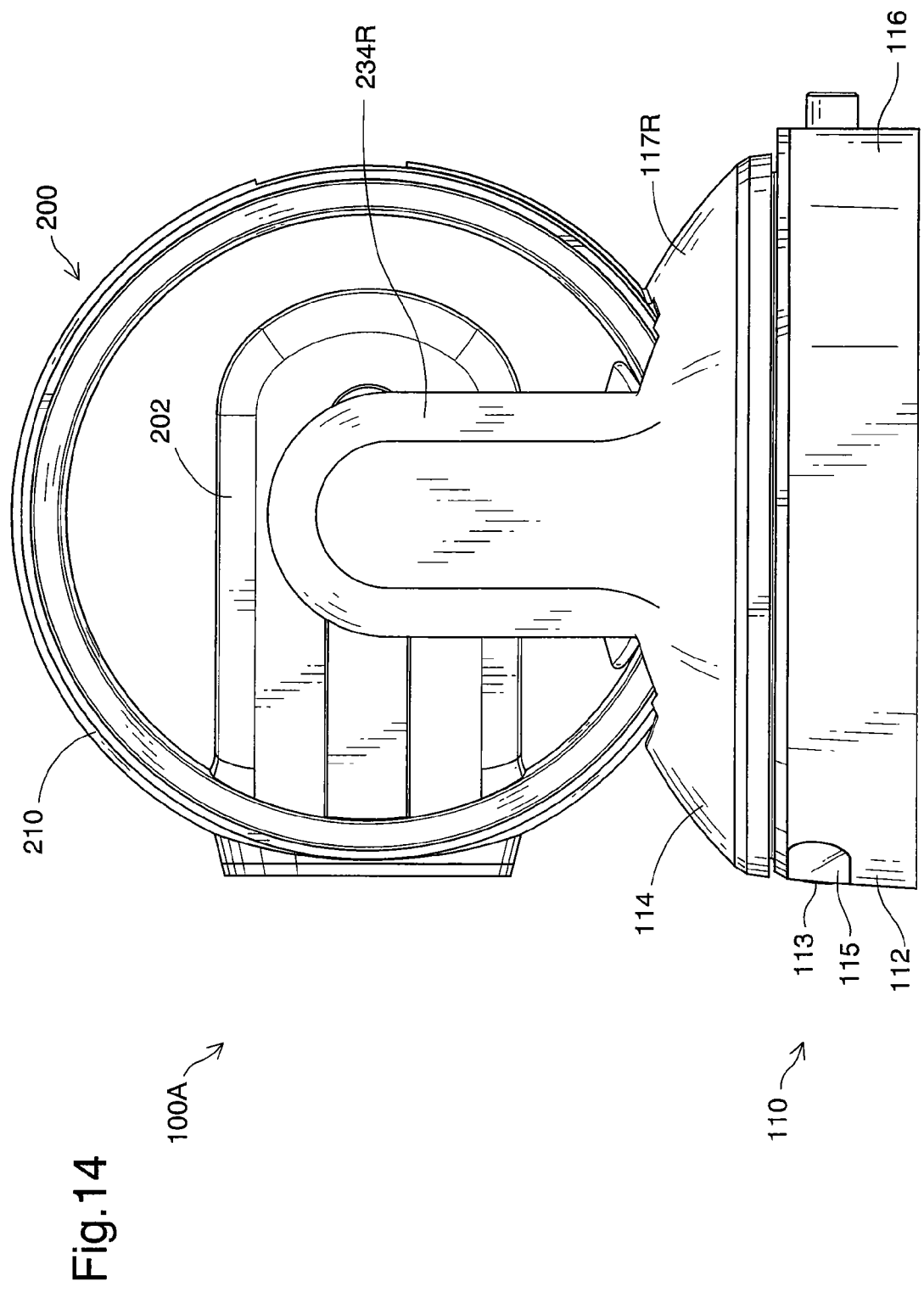
FIG. 14 is a side view showing the imaging apparatus of the first modified example.
Figure 15:
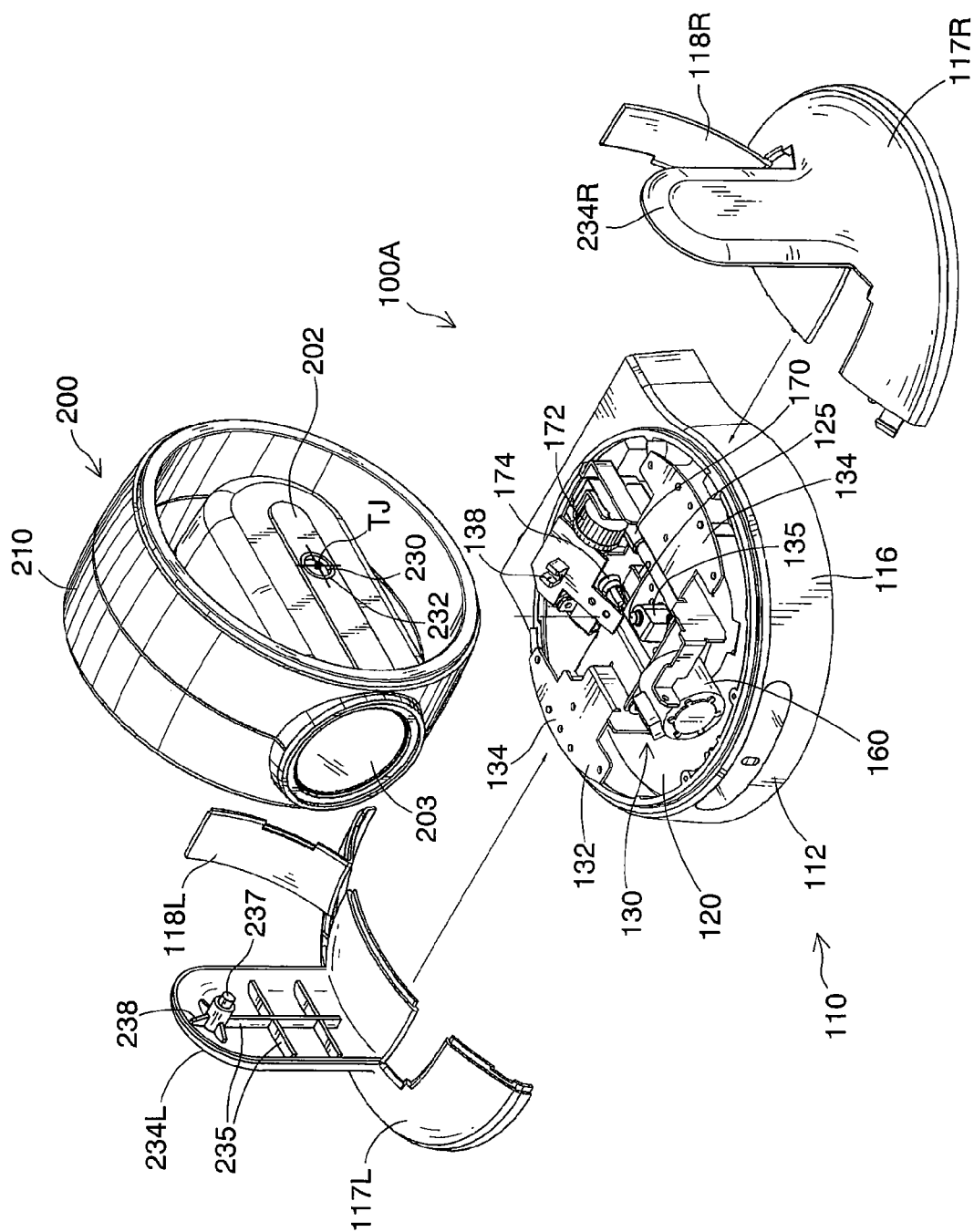
FIG. 15 is a decomposed perspective view showing the pivot support-related structure of the camera assembly and the base in the imaging apparatus of the first modified example.
Figure 16:
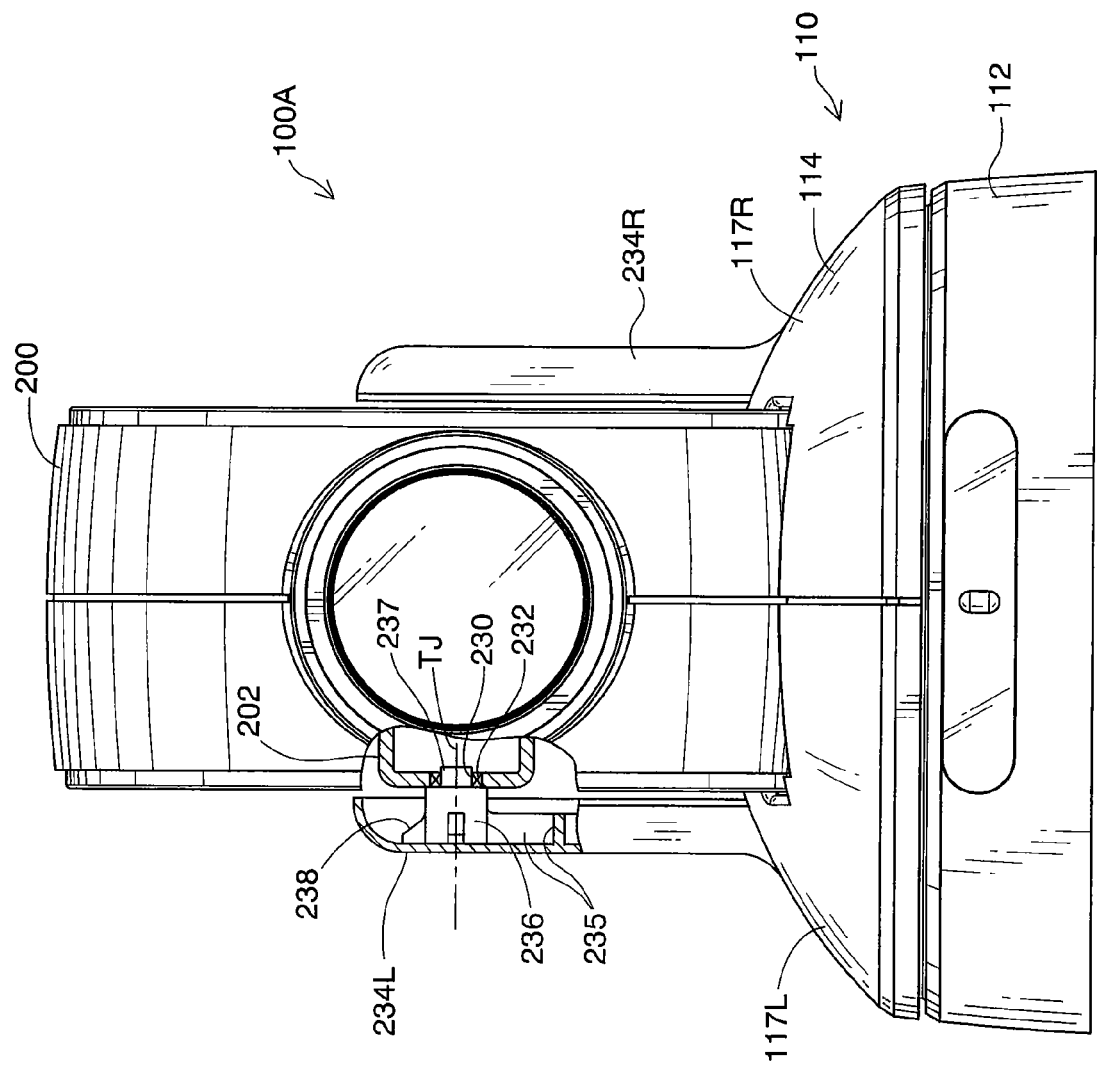
FIG. 16 is a partly sectional view showing the pivot support of the camera assembly in the imaging apparatus of the first modified example.

The structure of the imaging apparatus 100 of the embodiment may be modified in various ways. FIG. 13 is a perspective view showing an imaging apparatus 100A in a first modified example. FIG. 14 is a side view showing the imaging apparatus 100A of the first modified example. FIG. 15 is a decomposed perspective view showing the pivot support-related structure of the camera assembly 200 and the base 100 in the imaging apparatus 100A of the first modified example. FIG. 16 is a partly sectional view showing the pivot support of the camera assembly 200 in the imaging apparatus 100A of the first modified example.

With reference to FIGS. 13 through 16, the imaging apparatus 100A of the first modified example is characteristic of the direct pivot support of the camera assembly 200 about the vertical pivot axis TJ on its center. The camera assembly 200 has pivotal support holes 230 formed in the respective side faces of the casing of the camera 202. A bearing 232 is set in each of the pivotal support holes 230. The pivotal support holes 230 are located on the center of the camera assembly 200 and are arranged on or at least very close to the center of gravity of the camera frame 200.

In the imaging apparatus 100A of the first modified example, the panning motion-related structure and the driving source and the driving force transmission mechanism for the tilting motions provided in the assembly fixation structure 114 of the base 110 are identical with those in the imaging apparatus 100 of the embodiment. The first through the fourth rollers 141 through 144 and the sprint unit 150 for the pivot support of the camera assembly 200 in the imaging apparatus 100 of the embodiment are replaced by a pair of assembly holding plates 234L and 234R in the imaging apparatus 100A of the first modified example. The assembly holding plates 234L and 234R are protruded upright from the left and right cover splits 117L and 117R of the assembly fixation structure 114 to hold the camera assembly 200 therebetween. Reinforcement ribs 235 are formed on the respective inner walls of the assembly holding plates 234L and 234R facing the camera assembly 200. The reinforcement ribs 235 enable the assembly holding plates 234L and 234R to rigidly support the camera assembly 200 without deflection. Each of the assembly holding plates 234L and 234R has a projection 236 on the upper end of the reinforcement rib 235. The projection 236 has a pivotal support protrusion end 237, which is fitted in the pivotal support hole 230 formed in each side face of the camera assembly 200. The projection 236 is reinforced by the reinforcement rib 238.

In the imaging apparatus 100A of the first modified example, the left and right cover splits 117L and 117R are set on the pedestal plate unit 130 of the assembly fixation structure 114 in such a manner that the pivotal support protrusion ends 237 of the assembly holding plates 234L and 234R are respectively fitted in the pivotal support holes 230 on the side faces of the camera assembly 200. The assembly holding plates 234L and 234R facing each other across the camera assembly 200 pivotally support the camera assembly 200 to allow its pivotal rotation in the vertical direction about the pivotal support holes 230, while joining the camera assembly 200 with the base 110. The camera assembly 200 pivotally supported on the base 110 is vertically rotatable to have the tilting motions by the combination of the arc-shaped frame gear train 220 with the tilting rotation gear 172 and is horizontally rotatable to have the panning motions in the same manner as the imaging apparatus 100 of the embodiment described above. In the imaging apparatus 100A of this modified structure, the assembly holding plates 234L and 234R placed across the camera assembly 200 do not require the driving force transmission mechanism for the tilting motions. This arrangement desirably simplifies the pivot support structure for the tilting motions of the camera assembly 200 and requires only the two thin assembly holding plates 234L and 234R reinforced with the reinforcement ribs 235. These thin assembly holding plates 234L and 234R placed on both sides of the camera assembly 200 desirably exert the space-saving effect in the periphery of the camera assembly 200. The assembly holding plates 234L and 234R have the pivotal support protrusion ends 237 of the projections 236 that are in contact with or in proximity to the respective side faces of the casing of the camera 202. This arrangement ensures the stable tilting motions of the camera assembly 200 without inclination.

Figure 17:
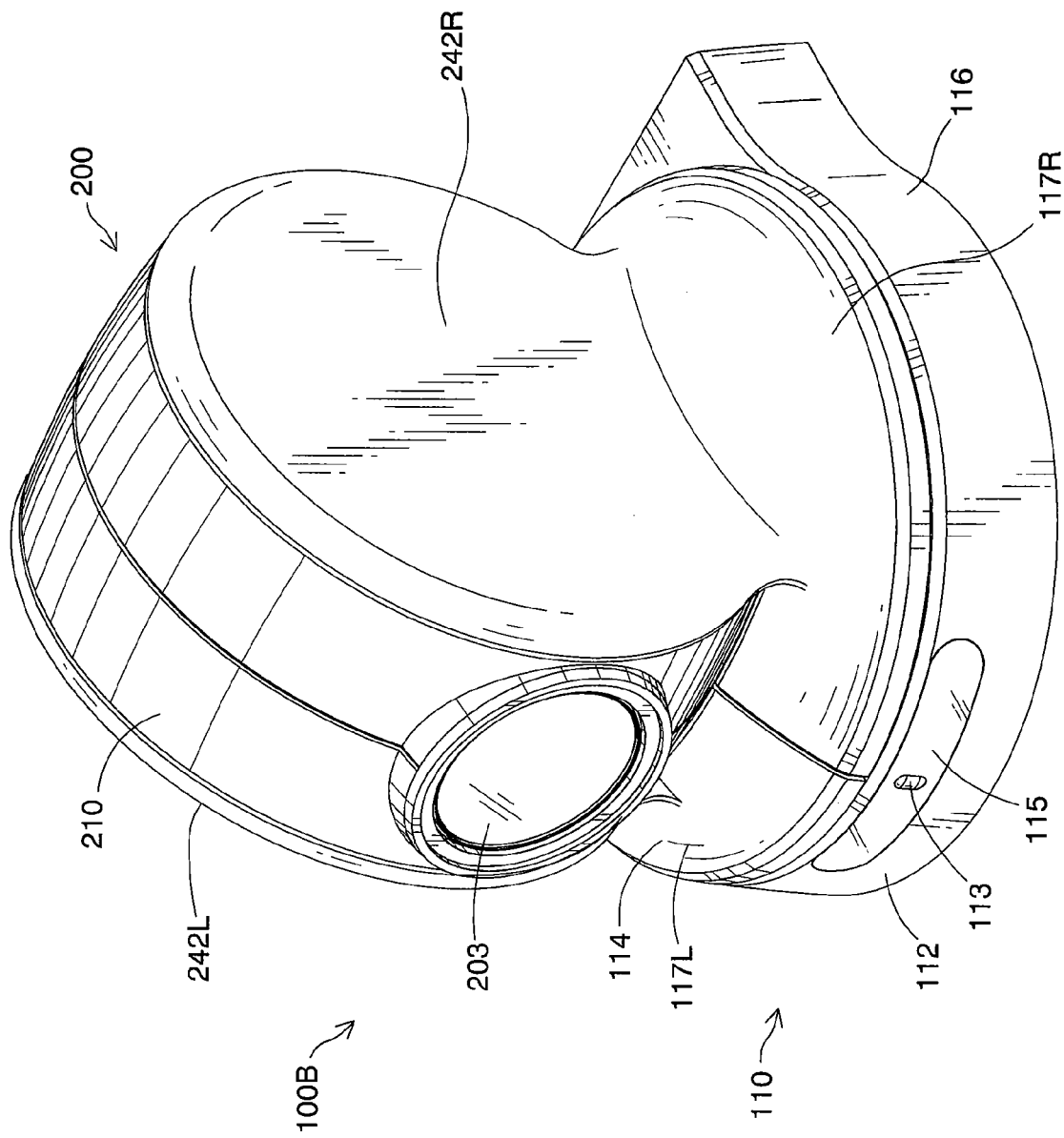
FIG. 17 is a perspective view showing an imaging apparatus in a second modified example.
Figure 18:
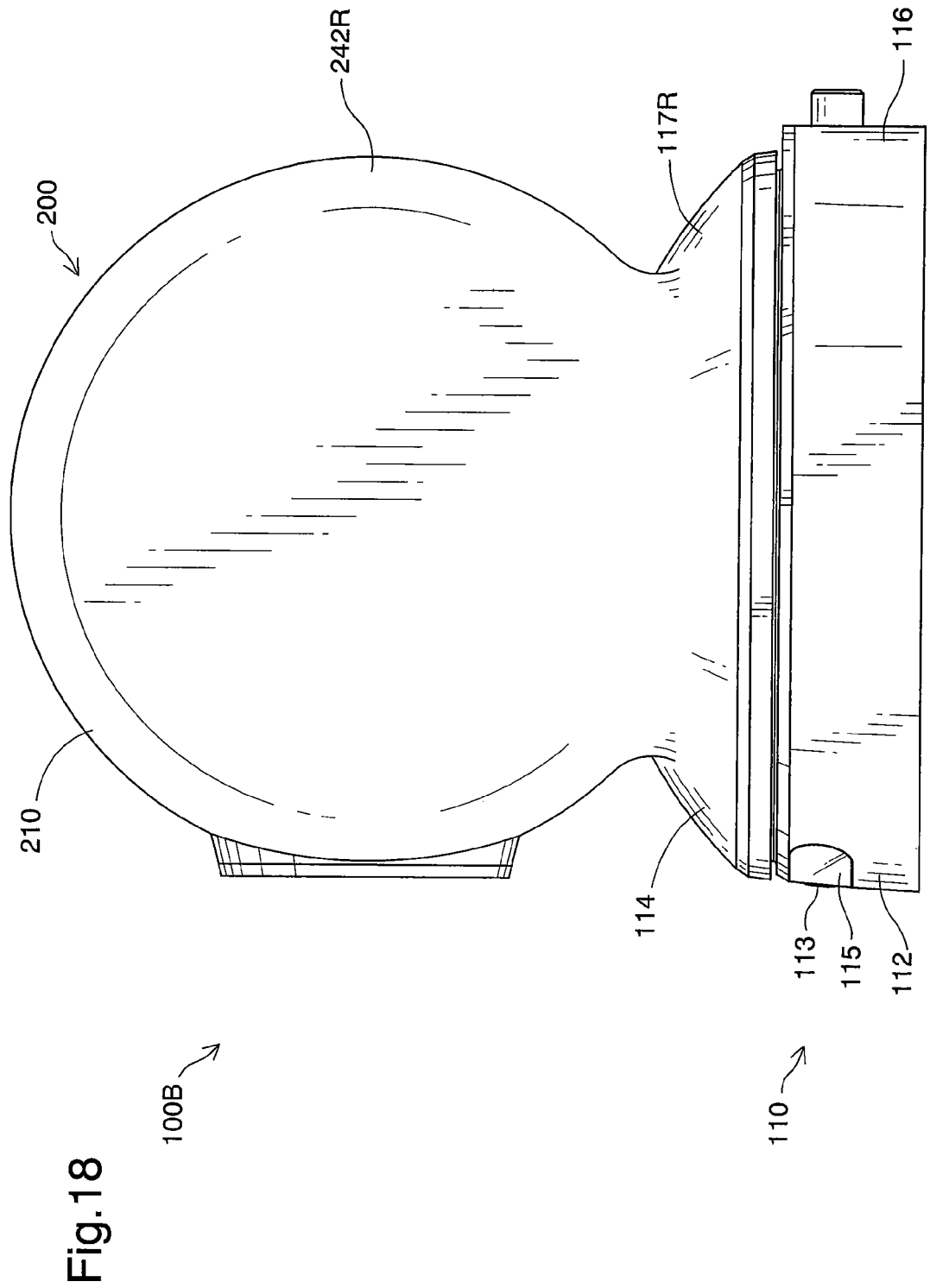
FIG. 18 is a side view showing the imaging apparatus of the second modified example.
Figure 19:
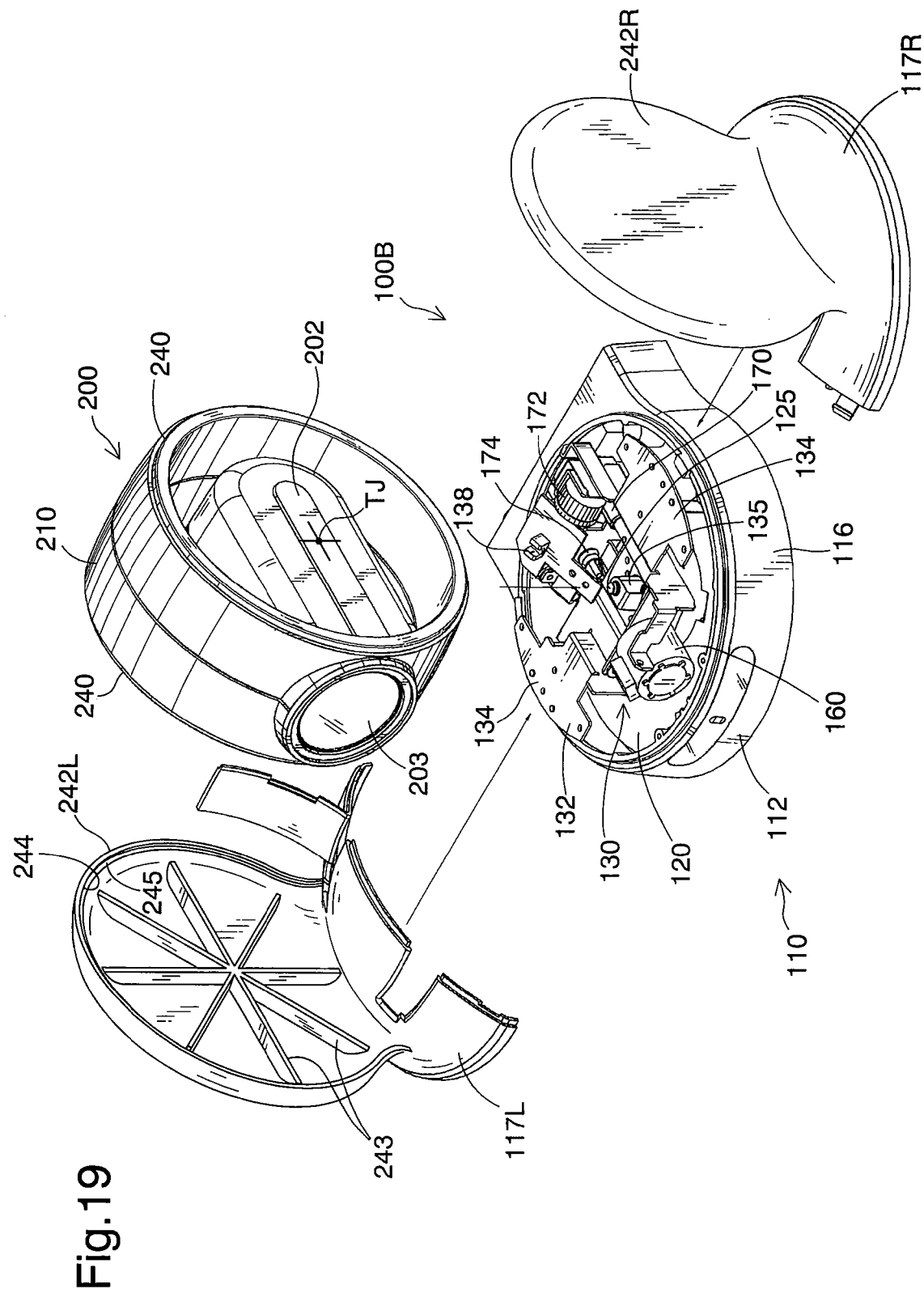
FIG. 19 is a decomposed perspective view showing the pivot support-related structure of the camera assembly and the base in the imaging apparatus of the second modified example.

FIG. 17 is a perspective view showing an imaging apparatus 100B in a second modified example. FIG. 18 is a side view showing the imaging apparatus 100B of the second modified example. FIG. 19 is a decomposed perspective view showing the pivot support-related structure of the camera assembly 200 and the base 100 in the imaging apparatus 100B of the second modified example. FIG. 20 is a partly sectional view showing the pivot support of the camera assembly 200 in the imaging apparatus 100B of the second modified example.

With reference to FIGS. 17 through 20, the imaging apparatus 100B of the second modified example is characteristic of the circumferential pivot support of the camera assembly 200 about the vertical pivot axis TJ on its center. The camera assembly 200 has circumferential steps 240 formed along the outer circumference on both sides of the frame casing 210. The circumferential steps 240 are used for the pivot support of the camera assembly 200 about the vertical pivot axis TJ.

In the imaging apparatus 100B of the second modified example, the panning motion-related structure and the driving source and the driving force transmission mechanism for the tilting motions provided in the assembly fixation structure 114 of the base 110 are identical with those in the imaging apparatus 100 of the embodiment. The first through the fourth rollers 141 through 144 and the sprint unit 150 for the pivot support of the camera assembly 200 in the imaging apparatus 100 of the embodiment are replaced by a pair of assembly holding plates 242L and 242R in the imaging apparatus 100B of the second modified example. The assembly holding plates 242L and 242R are extended from the left and right cover splits 117L and 117R of the assembly fixation structure 114 to hold the camera assembly 200 therebetween. The assembly holding plates 242L and 242R are formed in the dome shape to cover over the respective side faces of the camera assembly 200. Radially extended reinforcement ribs 243 are formed on the respective inner walls of the assembly holding plates 242L and 242R facing the camera assembly 200. The assembly holding plates 242L and 242R are used in combination with the curved projections 118L and 118R on the rear side of the camera assembly 200. The combination of the reinforcement ribs 243 with the curved projections 118L and 118R enable the assembly holding plates 242L and 242R to rigidly support the camera assembly 200 without deflection. Each of the assembly holding plates 242L and 242R has a circular step recess 244 formed along its periphery on the side facing the camera assembly 200. The circumferential steps 240 formed along the outer circumference on both sides of the frame casing 210 of the camera assembly 200 are fitted in the respective circular step recesses 244 of the assembly holding plates 242L and 242R. The circular step recess 244 is formed in a specific shape for receiving the circumferential step 240 except the area covered by the left cover split 117L or the right cover split 117R.

In the imaging apparatus 100B of the second modified example, the left and right cover splits 117L and 117R are set on the pedestal plate unit 130 of the assembly fixation structure 114 in such a manner that the circumferential steps 240 formed on both sides of the frame casing 210 of the camera assembly 200 are received in the circular step recesses 244 of the assembly holding plates 242L and 242R. The assembly holding plates 242L and 242R facing each other across the camera assembly 200 pivotally support the camera assembly 200 to allow its pivotal rotation in the vertical direction about the vertical pivot support TJ, while joining the camera assembly 200 with the base 110. The camera assembly 200 pivotally supported on the base 110 is vertically rotatable to have the tilting motions by the combination of the arc-shaped frame gear train 220 with the tilting rotation gear 172 and is horizontally rotatable to have the panning motions in the same manner as the imaging apparatus 100 of the embodiment described above. In the imaging apparatus 100B of this modified structure, the assembly holding plates 242L and 242R placed across the camera assembly 200 do not require the driving force transmission mechanism for the tilting motions. This arrangement desirably simplifies the pivot support structure for the tilting motions of the camera assembly 200 and requires only the two thin assembly holding plates 242L and 242R reinforced with the reinforcement ribs 243. These thin assembly holding plates 242L and 242R placed on both sides of the camera assembly 200 desirably exert the space-saving effect in the periphery of the camera assembly 200. In the assembly holding plates 242L and 242R, a bottom face 245 of the circular step recess 244 is in contact with or in proximity to the end face of the circumferential step 240 of the camera assembly 200. This arrangement ensures the stable tilting motions of the camera assembly 200 without inclination.

The embodiment and the modified examples discussed above are to be considered in all aspects as illustrative and not restrictive. There may be many other modifications, changes, and alterations without departing from the scope or spirit of the main characteristics of the present invention. For example, in the above embodiment and the modified examples, the camera assembly 200 is rotatable both in the vertical direction and in the horizontal direction to allow the tilting motions and the panning motions of the camera 202. The technique of the invention is also applicable to an imaging apparatus that allows only the tilting motions of a built-in camera. The imaging apparatus 100 is not restrictively used as the security camera but have diversity of other applications, for example, a web camera.

The imaging apparatus 100 of the above embodiment is placed on the table or the similar supporting subject. The imaging apparatus 100 may be suspended from the ceiling by fastening the base 110 to the ceiling. In this application, the spring legs 153 of the spring unit 150 are designed to have the sufficient sprint force for supporting the camera assembly 200 and pressing the camera assembly 200 against the first through the fourth rollers 141 through 144.

In the imaging apparatus 100 of the above embodiment, the camera assembly 200 has the doughnut-shaped frame casing 210. This shape is, however, not essential, but the frame casing 210 may have any other suitable shape. FIG. 21 is a side view showing a camera assembly 200C including a frame casing 210C of a different structure in an imaging apparatus 100C. In this modified example, the frame casing 210C of the camera assembly 200C has an arc shape without a frame section above the camera 202. The extension range of the frame casing 210C covers the vertically rotatable range of the camera 202 for the tilting motions and enables the pivot support of the camera assembly 200C on the assembly fixation structure 114.

In the structure of the embodiment, the camera assembly 200 has the doughnut-shaped frame casing 210. The camera assembly 200 may be modified to have an elliptical frame casing or an oval frame casing.

The controller 300 of the imaging apparatus 100 may be modified to have the hardware configuration in conformity with the USB (universal serial bus) standard. In this modified structure, USB connectors replace the RS-232C connectors. The controller 300 may otherwise be modified to have the wireless or wired LAN (local area network)-based hardware configuration. Such modification enables an imaging apparatus to be remotely controlled by an outside computer and to output images taken with a built-in camera via the wireless or wired LAN.

What is claimed is:

1. An imaging apparatus comprising:
a camera unit that includes a camera;
a base that has a built-in vertical rotation driving source to generate a driving force for pivotal rotation of the camera in the vertical direction and a built-in horizontal rotation driving source to generate a driving force for pivotal rotation of the camera in the horizontal direction;
a camera unit pivotal support structure that pivotally supports the camera unit on the base to allow pivotal rotation of the camera in the vertical direction;
a vertical rotation transmission mechanism that transmits the driving force of the vertical rotation driving source, as power of the pivotal rotation of the camera in the vertical direction, to the camera unit, so as to rotate the camera unit including the camera in the vertical direction;
a horizontal rotation gear that is provided as a transmission destination of the driving force of the horizontal rotation driving source and causes rotation of the camera unit, including the camera, in the horizontal direction; and
a horizontal rotation transmission mechanism that transmits the driving force of the horizontal rotation driving source, as power of the pivotal rotation of the camera in the horizontal direction, to the horizontal rotation gear,
the base having:
a ground plate that is directly placed on a surface of a supporting subject of the imaging apparatus;
a pivot shaft projecting from the ground plate for horizontally rotating the camera;
a pedestal plate that has the vertical rotation driving source disposed thereon, as well as the camera unit pivotal support structure and the vertical rotation transmission mechanism incorporated therein; and
a plate mounting structure that allows the pivot shaft to fit in a through hole provided in a pivot shaft fitting part which is fixed to the pedestal plate, so as to mount the pedestal plate on the ground plate to allow pivotal rotation of the pedestal plate in the horizontal direction relative to the ground plate,
wherein the horizontal rotation gear is located closer to the ground plate between the ground plate and the pedestal plate linked by the plate mounting structure and is attached to either one of a horizontal pivot axis and the ground plate in such a manner as to change a relative position of the horizontal rotation gear about the horizontal pivot axis to the pedestal plate but not to change a relative position of the horizontal rotation gear about the horizontal pivot axis to the ground plate;
the horizontal rotation driving source is placed with the horizontal rotation transmission mechanism on the pedestal plate; and
the horizontal rotation driving source and the vertical rotation driving source are arranged in an attitude having respective output shafts in the horizontal direction and are disposed to face each other across the plate mounting structure on the pedestal plate.

2. The imaging apparatus in accordance with claim 1, wherein the camera unit includes a camera frame that holds the camera in such a manner that an imaging lens of the camera is exposed on a circular arc-shaped frame side face of the camera frame to be directed to outside, the camera unit pivotal support structure pivotally supports the camera frame on the base to allow the pivotal rotation of the camera in the vertical direction about a vertical pivot axis such like an axis passing through inside of the camera frame in a direction parallel to a width of the camera frame, and the vertical rotation transmission mechanism transmits the driving force of the vertical rotation driving source to the camera frame via the circular arc-shaped frame side face arranged about the vertical pivot axis on its center.

3. The imaging apparatus in accordance with claim 2, wherein the vertical pivot axis such as the axis passing through the inside of the camera frame in the direction parallel to the width of the camera frame is located on the center of gravity of the camera frame.

4. An imaging apparatus comprising:

a camera unit that includes a camera;

a base that has a built-in vertical rotation driving source to generate a driving force for pivotal rotation of the camera in the vertical direction and a built-in horizontal rotation driving source to generate a driving force for pivotal rotation of the camera in the horizontal direction;

a camera unit pivotal support structure that pivotally supports the camera unit on the base to allow pivotal rotation of the camera in the vertical direction;

a vertical rotation transmission mechanism that transmits the driving force of the vertical rotation driving source, as power of the pivotal rotation of the camera in the vertical direction, to the camera unit, so as to rotate the camera unit including the camera in the vertical direction;

a horizontal rotation gear that is provided as a transmission destination of the driving force of the horizontal rotation driving source and causes rotation of the camera unit, including the camera, in the horizontal direction; and a horizontal rotation transmission mechanism that transmits the driving force of the horizontal rotation driving source, as power of the pivotal rotation of the camera in the horizontal direction, to the horizontal rotation gear, the base having:

a ground plate that is directly placed on a surface of a supporting subject of the imaging apparatus;

a pivot shaft projecting from the ground plate for horizontally rotating the camera;

a pedestal plate that has the vertical rotation driving source disposed thereon, as well as the camera unit pivotal support structure and the vertical rotation transmission mechanism incorporated therein; and a plate mounting structure that allows the pivot shaft to fit in a through hole provided in a pivot shaft fitting part which is fixed to the pedestal plate, so as to mounts the pedestal plate on the ground plate to allow pivotal rotation of the pedestal plate in the horizontal direction relative to the ground plate, wherein the horizontal rotation gear is located closer to the ground plate between the ground plate and the pedestal plate linked by the plate mounting structure and is attached to either one of a horizontal pivot axis and the ground plate in such a manner as to change a relative position of the horizontal rotation gear about the horizontal pivot axis to the pedestal plate but not to change a relative position of the horizontal rotation gear about the horizontal pivot axis to the ground plate;

the horizontal rotation driving source is placed with the horizontal rotation transmission mechanism on the pedestal plate;

the camera unit includes a camera frame that holds the camera in such a manner that an imaging lens of the camera is exposed on a circular arc-shaped frame side face of the camera frame to be directed to outside;

the camera unit pivotal support structure pivotally supports the camera frame on the base to allow the pivotal rotation of the camera in the vertical direction about a vertical pivot axis such as an axis passing through inside of the camera frame in a direction parallel to a width of the camera frame;

the vertical rotation transmission mechanism transmits the driving force of the vertical rotation driving source to the camera frame via the circular arc-shaped frame side face arranged about the vertical pivot axis on its center;

the vertical pivot axis such as the axis passing through the inside of the camera frame in the direction parallel to the width of the camera frame is located on the center of gravity of the camera frame; and the vertical rotation transmission mechanism has:

a circular arc-shaped frame gear train provided on the circular arc-shaped frame side face of the camera frame;

a base-side gear that is provided on the base to have teeth engaging with teeth of the circular arc-shaped frame gear train; and a base-side driving force transmission module that transmits the driving force of the vertical rotation driving source to the base-side gear.

5. The imaging apparatus in accordance with claim 4, wherein the camera unit pivotal support structure has:

a roller that supports the camera frame on its circular arc-shaped frame side face to allow pivotal rotation of the camera frame about the vertical pivot axis; and a pressing element that presses the camera frame against the roller.

* * * * *